United States Patent
Garcia Fernandez

(10) Patent No.: US 11,570,595 B2
(45) Date of Patent: Jan. 31, 2023

(54) METHOD AND NETWORK NODE FOR HANDLING A SERVICE SETUP FOR A USER EQUIPMENT

(71) Applicant: Telefonaktiebolaget LM Ericsson (publ), Stockholm (SE)

(72) Inventor: Raimundo Garcia Fernandez, Älvsjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/051,773

(22) PCT Filed: Apr. 30, 2018

(86) PCT No.: PCT/SE2018/050443
§ 371 (c)(1),
(2) Date: Oct. 29, 2020

(87) PCT Pub. No.: WO2019/212395
PCT Pub. Date: Nov. 7, 2019

(65) Prior Publication Data
US 2021/0243579 A1   Aug. 5, 2021

(51) Int. Cl.
*H04W 4/50*   (2018.01)
*H04W 76/10*   (2018.01)
(Continued)

(52) U.S. Cl.
CPC ............... *H04W 4/50* (2018.02); *H04L 65/65* (2022.05); *H04W 8/245* (2013.01); *H04W 76/10* (2018.02); *H04W 80/10* (2013.01)

(58) Field of Classification Search
CPC ... H04W 88/06; H04W 36/0022; H04W 4/16; H04W 48/18; H04W 68/00;
(Continued)

(56) References Cited

U.S. PATENT DOCUMENTS 9,060,366 B2 * 6/2015 Lau ........................ H04W 76/25
10,477,607 B2 * 11/2019 Buckley .............. H04L 65/1016
(Continued)

FOREIGN PATENT DOCUMENTS

WO   WO-2006001683 A1 *   1/2006   ............. H04L 29/06
WO   WO-2014161609 A1 *   10/2014   ............ H04W 76/18

OTHER PUBLICATIONS

3GPP TS 24.229 V15.0.0, "3rd Generation Partnership Project; Technical Specification Group Core Network and Terminals; IP multimedia call control protocol based on Session Initiation Protocol (SIP) and Session Description Protocol (SDP); Stage 3 (Release 15)," Sep. 2017, 987 pages, 3GPP Organizational Partners.
(Continued)

*Primary Examiner* — Matthew C Sams
(74) *Attorney, Agent, or Firm* — Nicholson De Vos Webster & Elliott LLP

(57) ABSTRACT

A method performed by a serving core network node in a communications network, for handling a service setup for a target User Equipment (UE) located in the communications network. The serving core network node receives a service setup request directed towards the target UE. The serving core network node sends a ping message to the target UE in response to the service setup request prior to a completion of a terminating service handling procedure of the serving network, wherein the terminating service handling procedure is completed when the service setup request is forwarded from a serving core network towards the target UE.

20 Claims, 14 Drawing Sheets

(51) Int. Cl.
*H04W 8/24* (2009.01)
*H04L 65/65* (2022.01)
*H04W 80/10* (2009.01)

(58) Field of Classification Search
CPC ... H04W 68/005; H04W 76/18; H04W 80/10; H04W 36/0083; H04W 36/14; H04W 36/30; H04W 4/02; H04W 48/16; H04W 60/06; H04W 68/12; H04W 76/10; H04W 76/16; H04W 76/25; H04W 8/04; H04W 84/12; H04W 4/50; H04W 8/245; H04L 65/1016; H04L 65/1006; H04L 65/1069; H04L 41/0806; H04L 65/105; H04L 65/1073; H04L 65/608; H04Q 11/06; H04Q 3/0045

See application file for complete search history.

(56) References Cited

U.S. PATENT DOCUMENTS

| | | | | |
|---|---|---|---|---|
| 2007/0281704 | A1* | 12/2007 | Lin | H04L 65/1016 455/445 |
| 2009/0003276 | A1* | 1/2009 | Mutikainen | H04W 48/18 370/329 |
| 2009/0303971 | A1* | 12/2009 | Kim | H04W 76/12 370/352 |
| 2011/0090845 | A1* | 4/2011 | Bishop | H04W 48/16 370/328 |
| 2014/0307706 | A1* | 10/2014 | Keller | H04W 36/0022 370/331 |
| 2014/0378149 | A1* | 12/2014 | Lau | H04L 65/1016 455/450 |
| 2015/0043453 | A1* | 2/2015 | Hegarty | H04L 45/74 370/329 |
| 2016/0072852 | A1* | 3/2016 | Keller | H04W 68/005 370/352 |
| 2016/0150497 | A1* | 5/2016 | Janosi | H04W 60/06 455/435.1 |
| 2019/0069126 | A1* | 2/2019 | Jahangir | H04W 4/02 |
| 2020/0100175 | A1* | 3/2020 | Cuevas Ramirez | H04W 36/0083 |
| 2020/0389504 | A1* | 12/2020 | Bouvet | H04Q 11/06 |

OTHER PUBLICATIONS

International Search Report and Written Opinion for International Application No. PCT/SE2018/050443, dated Nov. 9, 2018, 10 pages.
3GPP TS 23.401 V14.1.0, "3rd Generation Partnership Project; Technical Specification Group Services and System Aspects; General Packet Radio Service (GPRS) enhancements for Evolved Universal Terrestrial Radio Access Network (E-UTRAN) access (Release 14)," Sep. 2016, 379 pages, 3GPP Organizational Partners.
International Preliminary Report on Patentability for Application No. PCT/SE2018/050443, dated Nov. 12, 2020, 8 pages.
Communication pursuant to Article 94(3) EPC for EP Application No. 18725942.9, dated Jun. 11, 2021, 8 pages.
Communication pursuant to Article 94(3) EPC for EP Application No. 18725942.9, dated Jul. 19, 2022, 8 pages.

* cited by examiner

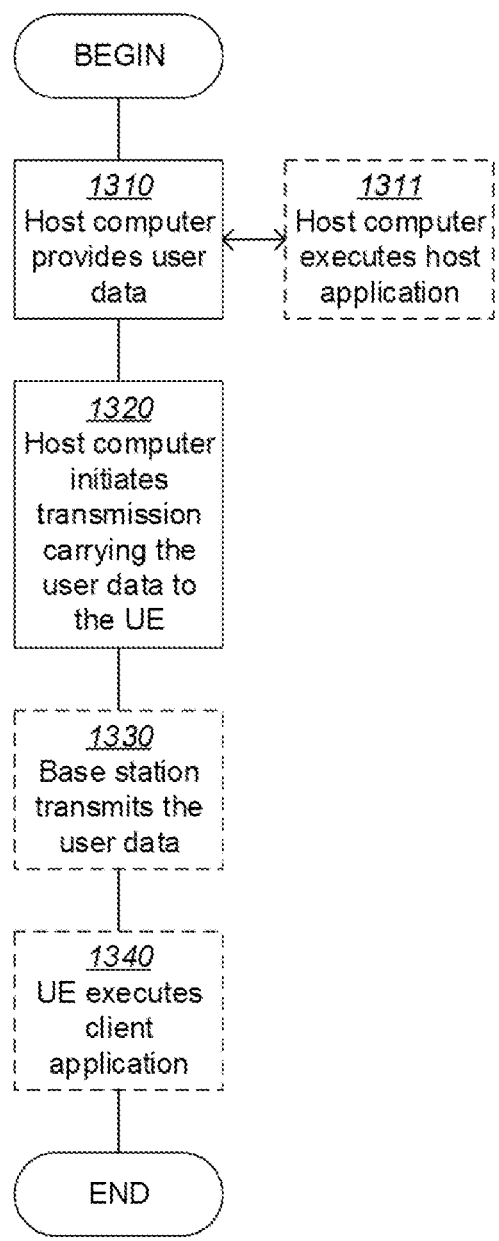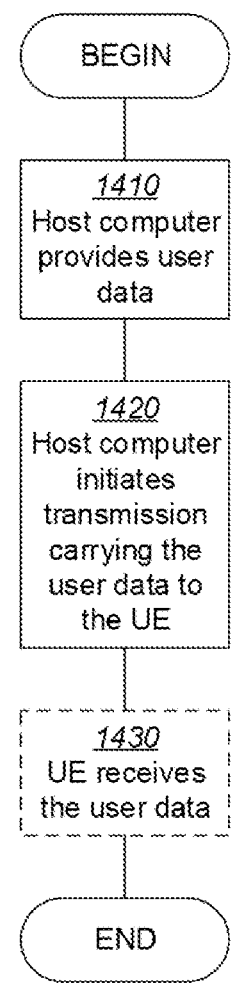
FIG. 13
FIG. 14

FIG. 15

BEGIN

1510 UE receives input data provided at host computer ↔ 1511 UE executes client application 1520 UE provides user data ↔ 1521 UE executes client application 1530 UE initiates transmission of the user data to the host computer 1540 Host computer receives user data transmitted from the UE

END

FIG. 16

BEGIN

1610 Base station receives user data from UE

1620 Base station initiates transmission of user data to the host computer

1630 Host computer receives the user data

END

METHOD AND NETWORK NODE FOR HANDLING A SERVICE SETUP FOR A USER EQUIPMENT

CROSS-REFERENCE TO RELATED APPLICATIONS

This application is a National stage of International Application No. PCT/SE2018/050443, filed Apr. 30, 2018, which is hereby incorporated by reference.

TECHNICAL FIELD

Embodiments herein relate to a method performed by a serving core network node in a communications network, a serving core network node, a computer program product and a computer-readable storage medium, for handling a service setup for a target User Equipment (UE) located in the communications network.

BACKGROUND

Communication services, such as e.g. voice calls, Short Message Services (SMS), chat, over cellular networks are main communication modes existing today. With an expanded reach and increased global uptake of communication services, it is imperative that mobile networks are optimized to deliver high quality performance for these latency sensitive services.

Current deployments of the aforementioned communication services imply a delay factor introduced by mobile network-centric procedures when providing the services, followed by a delay introduced to page a target User Equipment (UE) over a Radio Access Network (RAN) when the UE is in an idle state with regard to a Radio Resource Control (RRC) connection or an Evolved Packet System Connection Management (ECM) connection, which may herein also be referred to as being in IDLE mode. A UE is in an RRC_CONNECTED state when an RRC connection has been established between the UE and a radio network node. If this is not the case, i.e. no RRC connection is established, the UE is in the RRC_IDLE state. The ECM connection comprises the RRC connection over the radio interface and an S1 signalling connection over an S1-Mobility Management Entity (MME) interface. The ECM is in ECM-IDLE state when no ECM connection has been established between the UE and a core network node, such as e.g. a MME. The ECM is in ECM-CONNECTED state when an ECM connection has been established between the UE and the core network node.

The evolution of communication services implies even more complex network centric procedures as well as more processing logic in an end UE receiver, which may be the UE receiving the service request, to process data in order to establish communication services with a sender, which may be the entity sending the service request to the end UE receiver. The network-centric procedures, may herein also be referred to as terminating call handling procedures.

As an example, 3rd Generation Partnership Project (3GPP) Long Term Evolution (LTE), which may also be referred to as the Evolved Packet System (EPS), introduced a service for allowing voice traffic to be transmitted over a packet switched communications network. This service is commonly referred to as Voice over LTE (VoLTE). VoLTE end-to-end (E2E) call setup establishment spans over multiple domains, such as e.g., the UE, the RAN, an Evolved Packet Core (EPC), an IP Multimedia Subsystem (IMS) and a User Data Convergence (UDC). Each of these domains executes functions and procedures that are involved in the end-to-end call setup flow. Due to the number of functions and procedures executed in these domains a latency is introduced in a communications network which negatively affects the performance, such as e.g. the setup time for a service between a receiver and a sender, of the communications network.

SUMMARY

It is thus an object of the embodiments herein to provide a method for handling service setup for a UE, which reduces the required setup time and thus reduces the latency of the communications network.

According to a first aspect of embodiments herein, the object is achieved by a method performed by a serving core network node in a communications network, for handling a service setup for a target User Equipment (UE) located in the communications network. The serving core network node receives a service setup request directed towards the target UE. The serving core network node sends a ping message to the target UE in response to the service setup request prior to a completion of a terminating service handling procedure of the serving network, wherein the terminating service handling procedure is completed when the service setup request is forwarded from a serving core network towards the target UE.

According to a second aspect of embodiments herein, the object is achieved by a serving core network node in a communications network, for handling a service setup for a target User Equipment (UE) located in the communications network. The serving core network node is configured to receive a service setup request directed towards the target UE. The serving core network node is further configured to send a ping message to the target UE in response to the service setup request prior to a completion of a terminating service handling procedure of the serving network, wherein the terminating service handling procedure is completed when the service setup request is forwarded from a serving core network towards the target UE.

It is furthermore provided herein a computer program product comprising instructions, which, when executed on at least one processor, cause the at least one processor to carry out any of the methods above, as performed by the serving core network node. It is additionally provided herein a computer-readable storage medium, having stored thereon a computer program product comprising instructions which, when executed on at least one processor, cause the at least one processor to carry out the method according to any of the methods above, as performed by the serving core network node.

Embodiments herein provide a method to execute terminating service handling procedures for the target UE, as performed by a serving core network node such as e.g. an IMS node, and the paging procedures, as performed by the EPC in parallel rather than in sequential order, in order to reduce the delay aspects related to UEs the paging procedure, when the service setup request is received.

As a result, the total delay in executing and delivering the service setup request to the target UE will be equal to the delta execution time between a terminating service handling procedures timeframe and a paging execution timeframe, rather than the sum of the two timeframes. Hence the services will be provided and executed much quicker thus alleviating any latency sensitivity that currently exists.

BRIEF DESCRIPTION OF THE DRAWINGS

FIG. 13 is a flowchart depicting methods implemented in a communication system including a host computer, a base station and a user equipment in accordance with some embodiments;

FIG. 14 is a flowchart depicting methods implemented in a communication system including a host computer, a base station and a user equipment in accordance with some embodiments;

FIG. 15 is a flowchart depicting methods implemented in a communication system including a host computer, a base station and a user equipment in accordance with some embodiments;

FIG. 16 is a flowchart depicting methods implemented in a communication system including a host computer, a base station and a user equipment in accordance with some embodiments.

DETAILED DESCRIPTION

Figure 1:
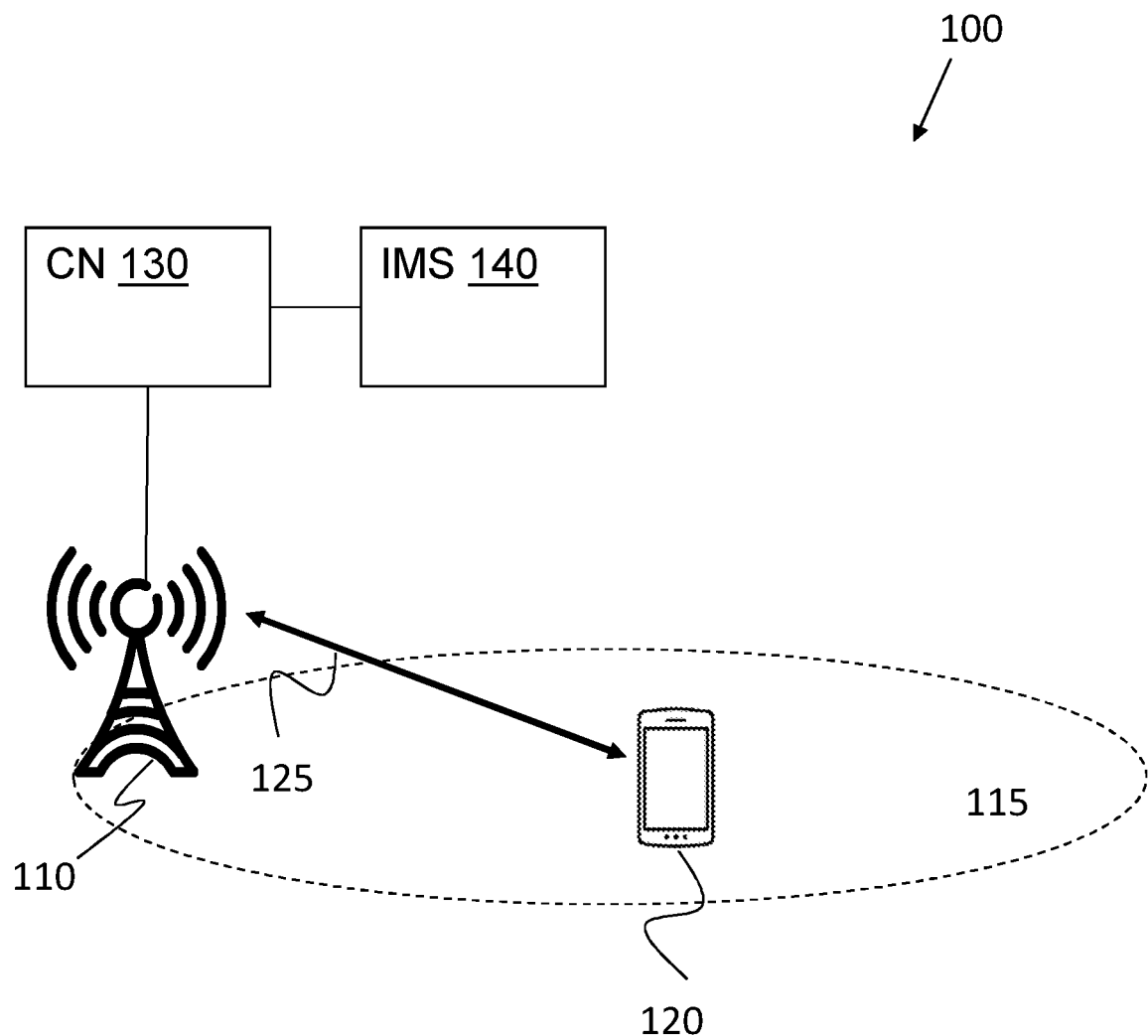
FIG. 1 is a schematic block diagram illustrating embodiments of a wireless communications network.

FIG. 1 is a block diagram illustrating an example wireless communication network, according to some of the embodiments herein. The wireless communication network 100 comprises one or more User Equipment (UE) 120, such as e.g. mobile phones, smart phones, laptop computers, tablet computers, Machine-Type Communication (MTC) devices, mobile stations, stations (STA), or any other devices that can provide wireless communication and thus may also be referred to as a wireless device. The UE 120 may communicate via the wireless communication network, such as a Local Area Network (LAN), such as e.g. a Wi-Fi network, or a Radio Access Network (RAN) to one or more core networks (CN) 130. The wireless communication network further comprises a network node 110, such as e.g. a radio access node e.g., a Wi-Fi access point or a radio base station (RBS), which in some networks may also be denoted, for example, a NodeB, eNodeB (eNB), or gNodeB (gNB) as denoted in New Radio (NR). NR may also be referred to as 5G. The network node 110 serves a coverage area 115, which may also be referred to as e.g. a cell, a beam or a beam group. The core network 130 may comprise one or more core network nodes, such as e.g. a Serving Gateway (Serving GW), a Packet Data Network Gateway (PDN GW), a MME and/or a Home Subscriber Server (HSS). The core network 130 may further connected to an IMS core network 140, which is shown in further detail in FIG. 2.

In general, UEs 120 that are within coverage of the network node 110, such as e.g., within the cell 115 served by network node 110, communicate with the network node 110 by transmitting and receiving wireless signals over a radio channel 125, which may also be referred to as a link. For example, the UE 120 and network node 110 may communicate wireless signals 125 containing voice traffic, data traffic, and/or control signals. When the network node 110 is communicating voice traffic, data traffic, and/or control signals to the UE 120 it may be referred to as a serving network node for the UE 120. The wireless signals 125 may include both downlink (DL) transmissions, i.e. from the network node 110 to the UE 120, and uplink (UL) transmissions, i.e. from the UE 120 to the network node 110. Each network node 110 may have a single transmitter or multiple transmitters for transmitting signals 125 to the UE 120. In some embodiments, the network node 110 may comprise a multi-input multi-output (MIMO) system. Similarly, each UE 120 may have a single receiver or multiple receivers for receiving signals 125 from the network node 110 or other UEs. Vice versa, the network node 110 may have a single receiver or multiple receivers for receiving signals 125 transmitted from the UE 120 or other network nodes, and the UE 120 may have a single transmitter or multiple transmitters for transmitting signals 125 to the network node 110. When the UE 120 connects to the communications network it may send a network attach request to the network node 110.

Figure 2:
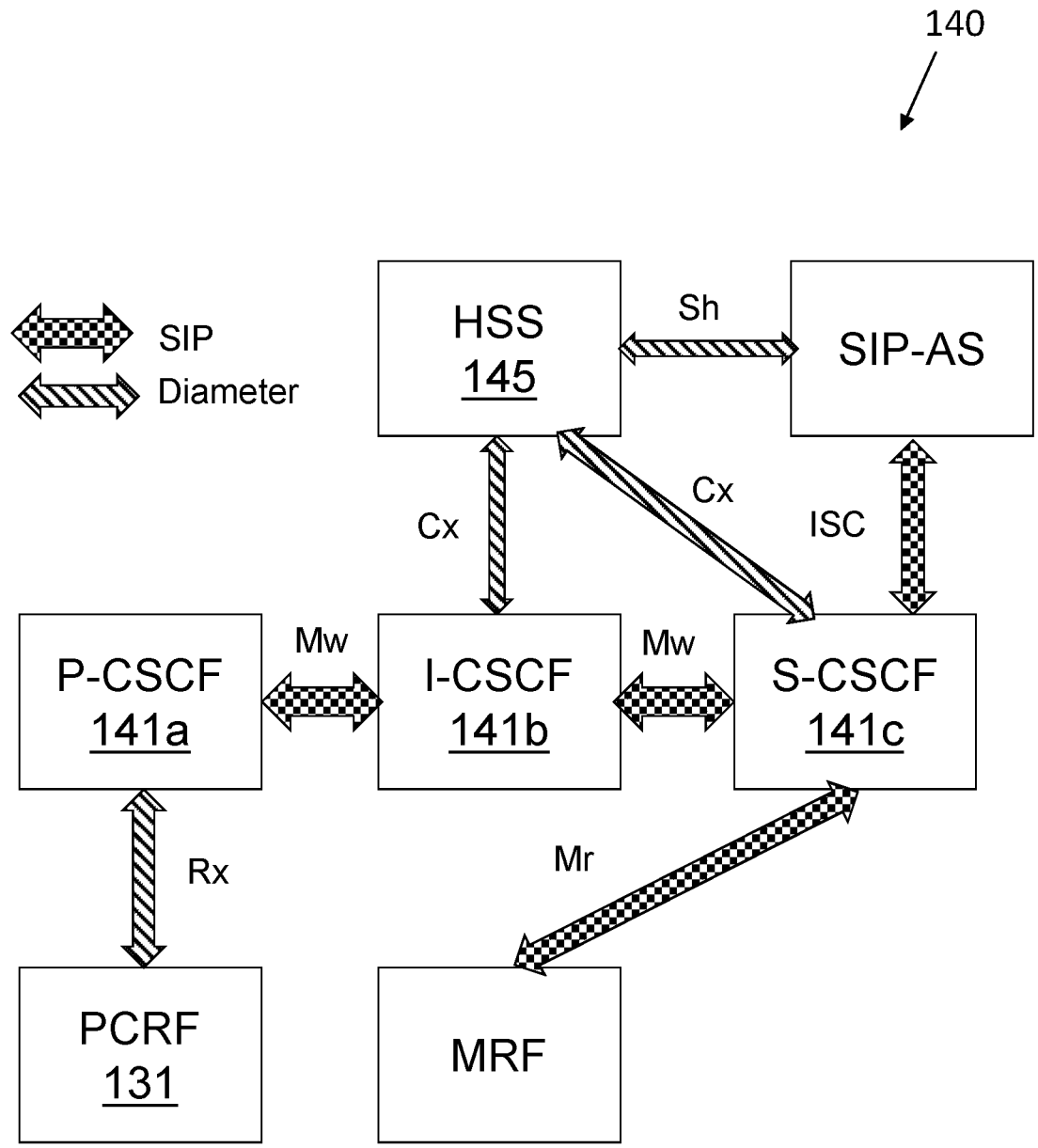
FIG. 2 is a schematic block diagram illustrating embodiments of an IMS core network.

FIG. 2 shows an overview of the IMS core network 140. The IMS core network 140 predominantly comprises a Call Session Control Function (CSCF) node 141a-c and a Home Subscriber Server (HSS) node 145. The CSCF node 141a-c plays an important role in the IMS core network 140. The CSCF node 141a-c facilitates SIP session setup and teardown. The HSS node 145 plays the role of a location server in the IMS 140, in addition to acting as an Authentication, Authorization and Accounting (AAA) server. The HSS node 145 also serves as a single point of provisioning for IMS subscribers and their services.

The CSCF node 141a-c comprises three logical verticals:
a) Proxy CSCF (P-CSCF) node 141a
b) Interrogating CSCF (I-CSCF) node 141b, and.
c) Serving CSCF (S-CSCF) node 141c.

The P-CSCF node 141a acts as an entry point into the IMS core network 140. All UEs 120 located in the IMS core network 140 are attached to the P-CSCF node 141a. The P-CSCF node 141a may be in a home domain or in a visited domain of the UE 120. The P-CSCF node 141a is responsible for routing incoming SIP messages to an IMS registrar server and for facilitating policy control over an Rx interface towards a Policy and Charging Rules Function (PCRF) node 131. The P-CSCF node 141a is also responsible for setting up IPSec Security associations with the UE 120, thus ensuring secure access to the IMS core network 140.

The I-CSCF node 141b acts as an inbound SIP proxy server in the IMS core network 140. During IMS registrations, the I-CSCF node 141b queries the HSS 145 to select an appropriate S-CSCF node 141c which is able to serve a target UE 120. During IMS sessions, the I-CSCF node 141b acts as the entry point to terminating session requests, such as e.g. terminating call procedures. The I-CSCF node 141b routes the incoming session requests to the S-CSCF node 141c of the target UE 120.

The S-CSCF node 141c may act as a registrar server, and in some cases as a redirect server. The S-CSCF node 141c is a central point for IMS service control over an ISC reference point. Moreover, the S-CSCF node 141c facilitates the routing path for mobile originated or mobile terminated session requests. The S-CSCF node 141c may also interact with a Media Resource Function over an MR interface for playing tones and announcements. The functions of the P-CSCF node 141a, the I-CSCF node 141b and the S-CSCF node 141c may be performed in one node, such as e.g. a collocated I/S-CSCF node 141bc, or in a plurality of nodes.

Figure 3:
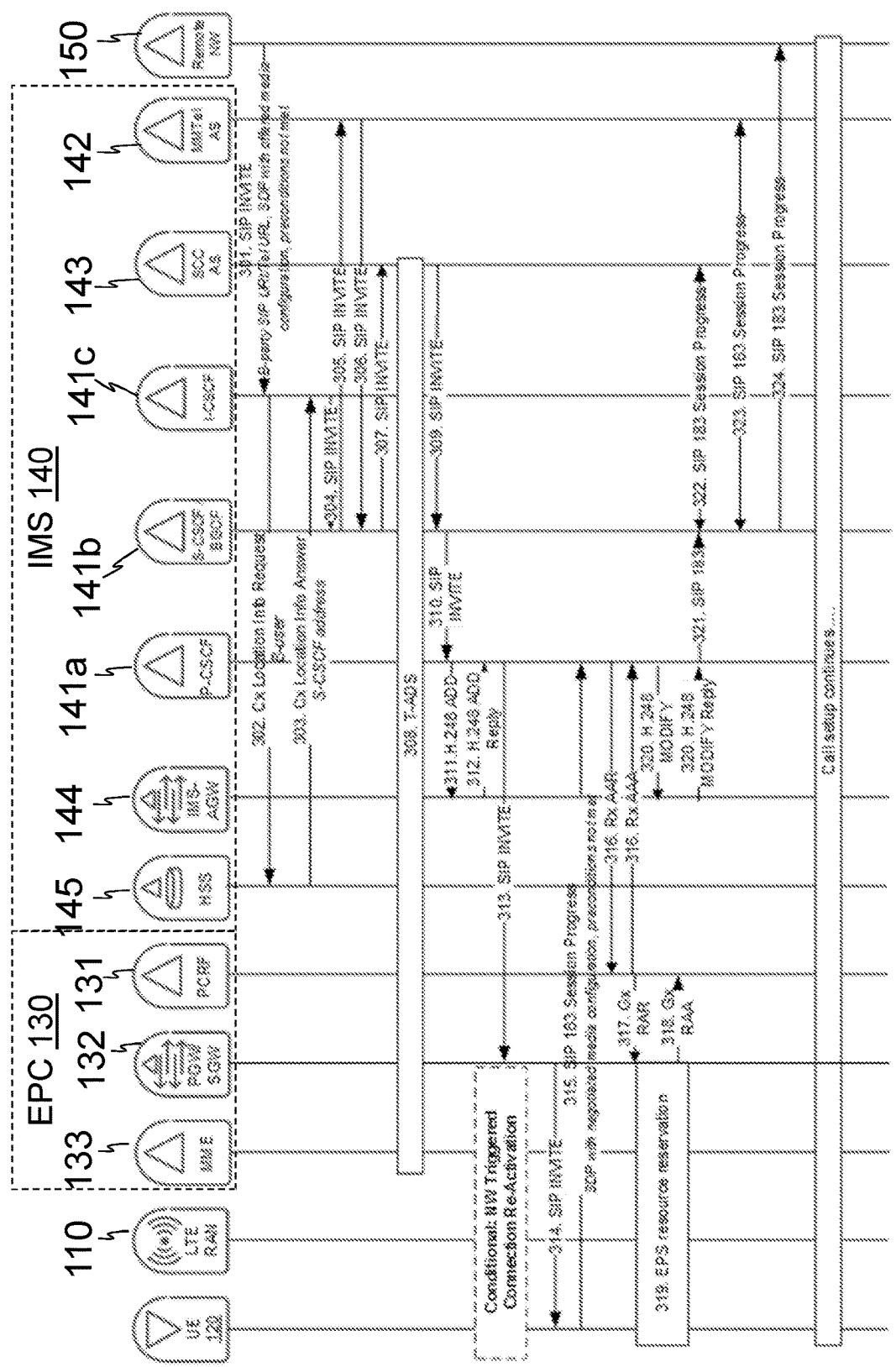
FIG. 3 is a flowchart illustrating a known terminating call flow performed over multiple domains.

FIG. 3 shows a known terminating call flow performed over multiple domains upon receipt of a service setup request, such as e.g. a VoLTE call. The network triggered service setup request procedure may be initiated by receiving a service setup request, such as e.g. a SIP INVITE, from a remote network 150. The network triggered service setup request procedure comprises a paging procedure and a service setup request procedure which are executed in a sequential order after the main time-consuming IMS Call handling procedures are conducted, such as e.g. a Location Information Request/Location Information answer (LIR/LIA), an Initial Filter Criteria for Application Servers Invocation such as e.g. the Multimedia Telephony Application Server (MMTel AS), or the Service Centralization and Continuity Application Server (SCCAS); and/or a Terminating Access Domain Selection procedure (T-ADS).

When the incoming service setup request, such as e.g. for a VoLTE call, is received from a remote network 150, in action 301, the IMS 140 performs the terminating call handling procedure. The main actions of the terminating call handling procedure comprises call setup parsing logic, routing, supplementary and regulatory services invocation and access selection logic through the following cross-domain main key procedures. The IMS 140 may start with performing a Location Information Request and Location Information Answer (LIR/LIA) through IMS-UDC cross-signalling, as shown in actions 302 and 303, in order to determine the S-CSCF 141b to which the target UE 120 is registered. The LIR/LIA may be performed between the I-CSCF 141c and the HSS 145. Thereafter, the SIP INVITE may be forwarded to the S-CSCF 141b to which the target UE 120 is registered in action 304. The S-CSCF 141b performs initial filter criteria and services invocation towards back to back MMtel in action 305 and 306 and SCCAS in action 307 and 309 by sending the SIP INVITE to the MMTEL AS node 142 and the SCCAS node 143. Thereafter a Terminating Access Domain Selection procedure (T-ADS) is conducted by the SCCAS node 143 through IMS-UDC-EPC cross-signalling in order to determine how to terminate the call at the target UE 120, as shown in action 308.

The IMS 140 then forwards the terminating SIP Invite to a registered UE 120, which may herein also be referred to as a target UE 120, via a Packet Gateway (PGW) node 132, which can be seen in action 311 of FIG. 3. This may be performed by the SCCAS node 143 forwarding the SIP INVITE to the S-CSCF node 141b, as shown in action 309, which then forwards the SIP invite to the P-CSCF node 141a. The P-CSCF node 141a then sends a H.248 ADD request to an IMS-Access Gate Way (AGW) node 144 in action 311 requesting the IMS-AGW to allocate transport resources to the target UE 120. When the P-CSCF node 141a has received the allocated transport resources from the IMS-AGW node 144 in action 312, the P-CSCF node 141a forwards the SIP INVITE to the PGW node 132 which has the target UE 120 registered. If the PGW node 132 detects that the target UE 120 is in idle mode, the PGW node 132 initiates a Network (NW) Triggered Connection Re-Activation procedure towards the target UE 120 after the IMS Call handling procedures have been completed, i.e. when the SIP Invite has been forwarded from the IMS 140 to the EPC 130 in action 313. The NW triggered Connection Re-Activation procedure comprises the paging procedure and a service request procedure, wherein the paging procedure is performed in order to trigger the target UE 120 to transition from the IDLE state to the CONNECTED state.

After the target UE 120 has transitioned to the CONNECTED state, the PGW node 132 may send the SIP Invite to the target UE 120.

In response, the target UE 120 may send a SIP 183 Session Progress message to the P-CSCF node 141a in action 315. The S-CSCF node 141b in action 316 sends an AA Request (AAR) message to the PCRF node 131 through the Rx interface to provide Session Information.

The PCRF node 131 in action 317 may send a Re-Auth-Request (RAR) message to the PGW node 132 through the Gx interface, instructing the PGW node 132 to modify bearer information for a media stream, such as e.g. a VoLTE media stream.

The PGW node 132 may perform an EPS resource reservation procedure in order to reserve resources across the network in action 319 and then sends a Re-Auth Answer (RAA) message to the PCRF node 131 through the Gx interface in action 320.

The PCRF node 131 may send an AA Answer (AAA) message to the P-CSCF node 141a through the Rx interface in response to the AAR message received from the S-CSCF node 141b.

In actions 320 the P-CSCF node 141a may send a H.248 MODIFY request to the IMS-AGW node 144 requesting the IMS-AGW node 144 to modify the allocated transport resources to the target UE 120 and may receive a H.248 MODIFY Reply from the IMS-AGW node node 144.

Thereafter the SIP 183 Session Progress message may be forwarded from the P-CSCF node 141a to the S-CSCF node 141b in action 321. The S-CSCF node 141b may then exchange the SIP 183 Session Progress message with the SCCAS node 143 in action 322 and with the MMTel AS node 142 in action 323, before the SIP 183 Session Progress message may be forwarded by the S-CSCF node 141b to the remote NW 150 in order to connect the VoLTE call.

One of the main problem areas of the present system is related to Voice over LTE Call Setup Time (CST) when the target UE 120, at which the call is terminated and thus may herein also be referred to as a terminating UE, is in idle mode. The main portion of the delay is introduced by the target UE 120 transitioning from an IDLE state, such as e.g. an ECM-IDLE state or an RRC-IDLE state, to a CONNECTED state, such as e.g. an ECM-CONNECTED state or an RRC-CONNECTED state. This transition is triggered by the NW Triggered Connection Re-Activation procedure. Forcing the target UE 120 to remain in connected mode is not an option, since this would imply a drawback for Mobile Broadband (MBB) Data traffic. Idle mode provides an efficient way of pushing the UE 120 to the best carrier for performance. Other mechanisms for mobility control do not do this as well as idle mode reselection:

Coverage/Quality—Only works if UE is in bad Radio Frequency (RF) or otherwise continually scans preferred frequencies which can impact throughput.

Load balancing—does not guarantee that the UE will be the one shifted to the optimum carrier and could lead to UEs for MBB connecting to low BandWidth (BW) carriers.

Figure 4:
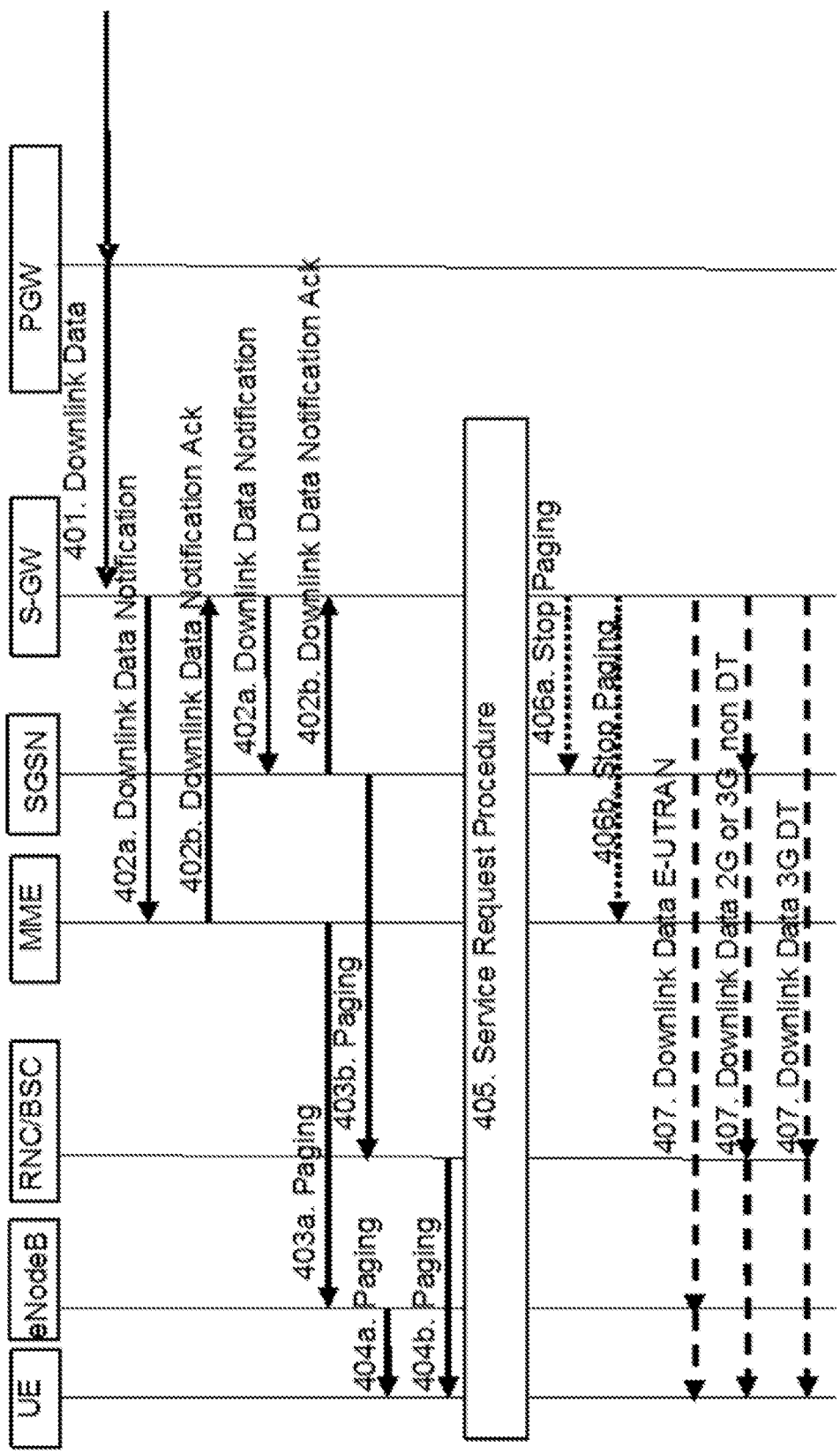
FIG. 4 is a flowchart illustrating a network triggered connection re-activation procedure.

The NW triggered Connection Re-Activation procedure is shown in greater detail in FIG. 4. The NW triggered Connection Re-Activation procedure may start with the serving core network node 130, 140, such as e.g. the IMS node 140, such as e.g. the P-CSCF node 141a, sending an invite for setting up a service to the target UE 120, such as e.g. a SIP Invite, to a contact address of the target UE, which is registered on the PGW in the EPC. At this point, the PGW sends DL data, see action 401, such as e.g. a SIP Invite packet, to the SGW, via e.g. an IMS signalling bearer on an IMS Access Point Name (APN). If the SGW detects that the target UE 120 is in idle mode; in other words, when there is no NAS signalling connection, the SGW may send a 'Downlink Data Notification' message to the MME and to a Serving GPRS Support Node (SGSN) see action 402a, which triggers the MME and the SGSN to page the UE 120 in action 403a and 403b. Prior to sending the paging the MME and the SGSN reply to the Downlink Data Notification message by sending a Downlink Data Notification Acknowledgement (ACK) message to the S-GW.

When the target UE 120 has been paged, see action 404a and 404b, the service request procedure is started in action 405 in order to perform data bearer re-establishment between the UE 120 and the communications network 100. The Service Request procedure is used when the UE 120 or the network 100 (triggered by paging from the network side) wants to re-establish all the radio bearers that were active before the UE 120 entered idle state.

When the Service Request Procedure is finished and the data bearer has been established, the paging may be stopped by the S-GW sending a stop paging message to the MME and the SGSN, actions 406a and 406b, and downlink data may be forwarded from the S-GW to the target UE 120 in actions 407.

The sequential order of the execution of the IMS procedures and the paging procedure through the terminating call setup flow is a significant problem with existing solutions and one of the main contributor to the service setup time delay. The paging procedure and the service request introduces a delay of approx. 400-500 ms into the total end to end call setup.

The embodiments provided herein aim to significantly reduce or totally erase this 400-500 ms delay. The embodiments provided herein solve the above mentioned problem by triggering a paging procedure for the target UE 120 while a serving network continues with an execution of serving network procedures associated to the service setup. The paging may e.g. be triggered by sending a ping message to the target UE 120 from the network serving the target UE 120, upon the reception of the service setup request directed towards the target UE 120. The transmission of the ping message may be executed by any network component, such as e.g. a node, in a core network, such as an IMS, of the serving network. The ping message may be executed by sending any type of communication exchange protocols which are client-server based, such as e.g. Hypertext Transfer Protocol (HTTP) or SIP.

By triggering the paging of the target UE 120 much earlier than in the current solution, by pinging the target UE 120 while the terminating call handling procedure is still processing by the IMS node 140, i.e. prior to a completion of the terminating call handling procedure of the IMS, the delay can be significantly reduced. This may e.g. be achieved by sending a SIP OPTIONS request from the IMS node 140, such as e.g. the CSCF node 141a-c, towards the target UE 120 registered in a Packet Switched (PS) domain of the communications network 100, upon reception of the service setup request, such as e.g. a terminating INVITE.

Hence, according to the embodiments herein the signalling flow for the paging procedure to wake the target UE 120 from IDLE mode will take place in parallel with the signalling flow for the IMS terminating call handling procedure, such as e.g. the MMTEL and SCCAS invocation, the terminating access domain selection procedure (T-ADS), and also the Location Information Request (LIR/LIA) if the target UE 120 registered in a collocated I/S-CSCF node 141b-c. This is shown in further detail in FIGS. 6 and 7.

As a result the target UE 120 will have entered connected mode or nearly, by the time the INVITE request is sent by the IMS towards the target UE 120 via the EPC/RAN. From the E2E Volte call setup time perspective there will not be any significant difference when the target UE 120 is in connected or idle mode when the call is placed. The embodiments herein may e.g. execute the IMS terminating call procedure and the paging procedure in parallel within the same timeframe by sending a ping message, such as e.g. a SIP OPTIONS request, upon reception of e.g. a terminating INVITE, from an IMS node 140, such as e.g. a CSCF node 141a-c, towards the target UE 120 such as a registered target UE. The IMS node 140 may e.g. determine that the UE 120 is registered in the packet switched (PS) domain, such as e.g. in LTE, based on information in a P-AccessNetwork-Info (PANI) header, such as e.g. a value indicating the an access type "3GPP-E-UTRAN-FDD" or "3GPP-EUTRAN-TDD", stored by the IMS node, such as e.g. the CSCF node 141a-c, upon the UE 120 registering into the communications network. Upon reception of the service setup request, the serving core network node may determine if the target UE 120, which may also be referred to as the terminating UE, has one or several contacts registered with the PANI header including either the access-type "3GPP-E-UTRAN-FDD" or "3GPP-E-UTRAN-TDD". The above mentioned access types indicate that the target UE 120 may be on an LTE RAN.

The SIP OPTIONS message may be sent as an end-to-end (E2E) message. The SIP OPTIONS message may be used both to query the capabilities, such as e.g. services which the UE has available, of the target UE 120 and to send information about which capabilities that are supported by the node sending the SIP OPTIONS message to the UE. Using this method, both the node sending the SIP OPTIONS message and the target UE 120 receives updated information in a single transaction.

Figure 5:
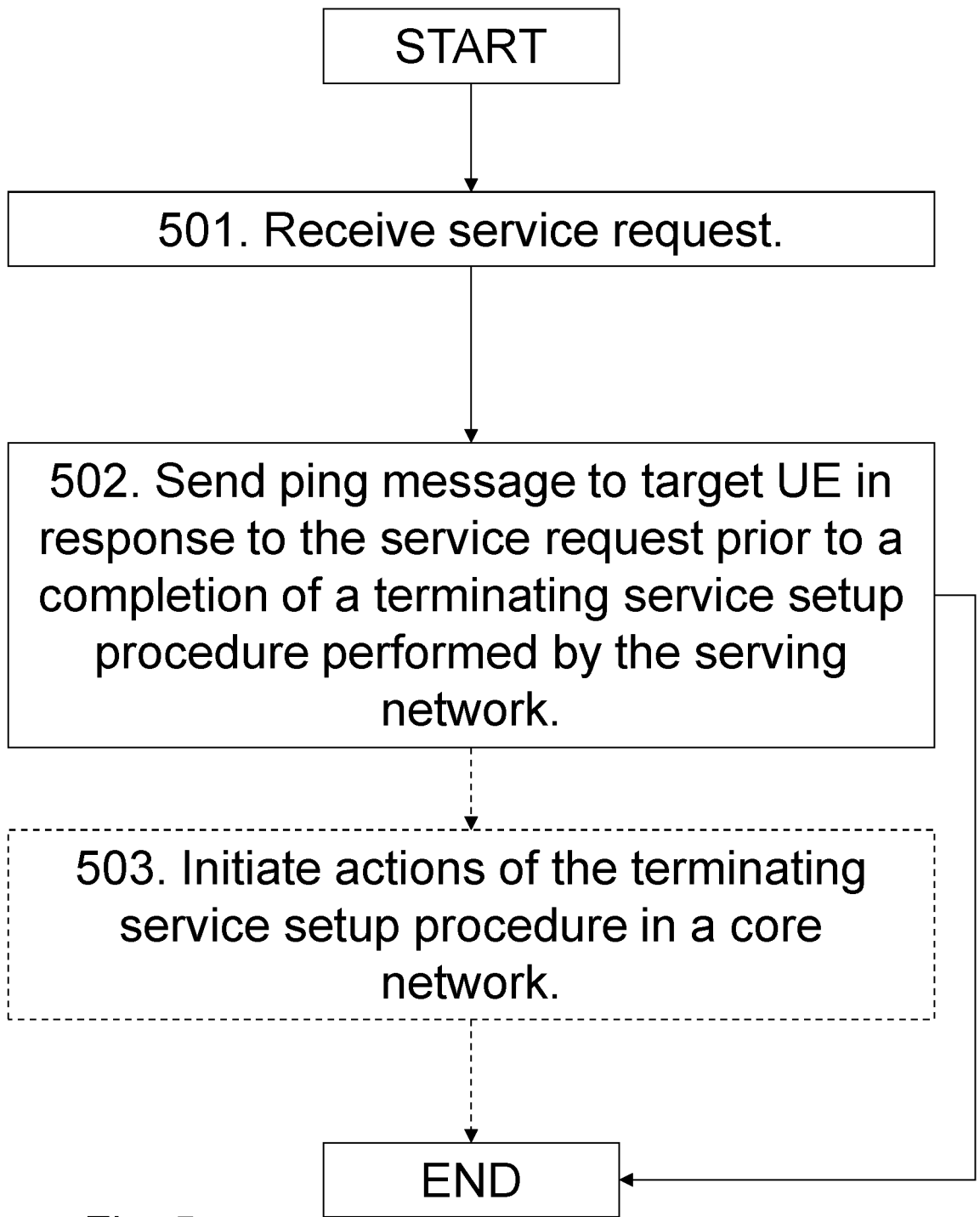
FIG. 5 is a flowchart illustrating a method performed by an IMS node.

FIG. 5 illustrates the method actions performed by the serving core network node 130, 140 in a communications network, for handling a service setup for the target UE 120 located in the communications network 100. The serving core network node 130, 140 may be a Core network node 130 or an IMS node 140. Actions performed in some embodiments only are marked with dashed boxes. The serving core network node 130, 140 may in some embodiments be an IMS node 140 of the IMS in the communications network 100.

Action 501: The serving core network node 130, 140 receives a service setup request directed towards the target UE 120.

The service setup request received by the serving core network node 130, 140 may be received from a remote network. The remote network may be any other network than the serving communications network 100.

The service setup request may e.g. be a SIP invite, a H.323 protocol invite or a Web Real-Time Communication (WebRTC) invite, which initiates a dialog with the intent to establish a service with the target UE 120.

In some embodiments the IMS node 140 may be a CSCF node 141a-c. The CSCF node 141a-c may comprise an S-CSCF node 141b, and the service setup request received by the S-CSCF node 141b may be forwarded from an I-CSCF node 141c comprised in the CSCF node 141a-c.

Action 502: The serving core network node 130, 140 sends the ping message to the target UE 120 in response to the service setup request prior to a completion of a terminating service handling procedure performed by the serving network.

In some embodiments, when the serving core network node 130, 140 is an IMS node 140, the ping message may be sent to the target UE 120 in response to the service setup request prior to a completion of a terminating service handling procedure performed by the IMS node 140. The terminating call handling procedure may be completed when the service setup request is forwarded from the IMS to an EPC associated with the target UE 120. The EPC being associated with the target UE 120 shall herein be interpreted as the target UE 120 being registered to the EPC. The ping message may e.g. act as a triggering message which wakes up the target UE 120 when the UE 120 is in IDLE mode.

The ping message to the target UE 120 may be sent in response to the service setup request within a time frame ti of 0-30 ms from receiving the service setup request.

The ping message may further be sent in response to the service setup request prior to performing any further actions of the terminating service handling procedure, such as e.g. a call handling procedure, in the communications network, such as e.g. in the IMS of the communications network 100.

The ping message may e.g. be sent in response to the service setup request prior to performing a Terminating Access Domain Selection procedure (T-ADS) in the IMS, prior to performing a service invocation with the MMTel-AS node 143 in the IMS and/or prior to performing a Location Information Request (LIR) in the IMS.

The ping message may be any piece of data sent from the communications network 100 to the UE 120, such as e.g. a SIP OPTION message sent to the UE 120.

The IMS node 140 may e.g. be a CSCF node 141a-c of the IMS. The CSCF node 141a-c may comprise an S-CSCF node 141b, and the S-CSCF node 141b may send the ping message in response to the received service setup request.

Action 503: The serving core network node 130, 140 may initiate actions of the terminating service handling procedure in the core network of the communications network, such as e.g. in the IMS node 140 of the communications network 100, at the same time or shortly after the ping message has been sent. The actions of the terminating service handling procedures performed by the core network node, may be e.g. be terminating call handling procedures, such as e.g. MMTEL and SCCAS invocation, T-ADS, LIR/LIA and other procedures for allocating transport resources to the target UE 120. Thereby, the terminating service handling procedures may be performed in parallel with the paging procedure and a Network Triggered Connection Re-Activation forcing the target UE 120 to transition from IDLE state to CONNECTED state. The actions of the terminating service handling procedures are described further in relation to actions 302-312 in FIG. 3, actions 702-712 in FIG. 7 and actions 802-812 in FIG. 8.

A prerequisite for the embodiments herein relating to the IMS node may be that the target UE 120 is registered with a contact, such as e.g. has a PANI header comprising one of the values 3GPP-E-UTRAN-FDD or 3GPP-EUTRAN-TDD.

The embodiments herein have the advantage that a target UE 120 which has been in IDLE state will be connected, or at least almost connected, by the time the service setup request arrives at the target UE 120, since the ping message is sent very early, thereby leading to terminating service handling procedure, paging procedure and Network Triggered Service setup request being executed simultaneously.

By performing the paging procedure to wake the UE in parallel with the terminating service handling procedure, such as e.g. MMTEL and SCCAS invocation, T-ADS, and LIR/LIA if the target UE is registered in a collocated I/SCSCF, the time for handling a service setup can be drastically reduced.

Figure 6:
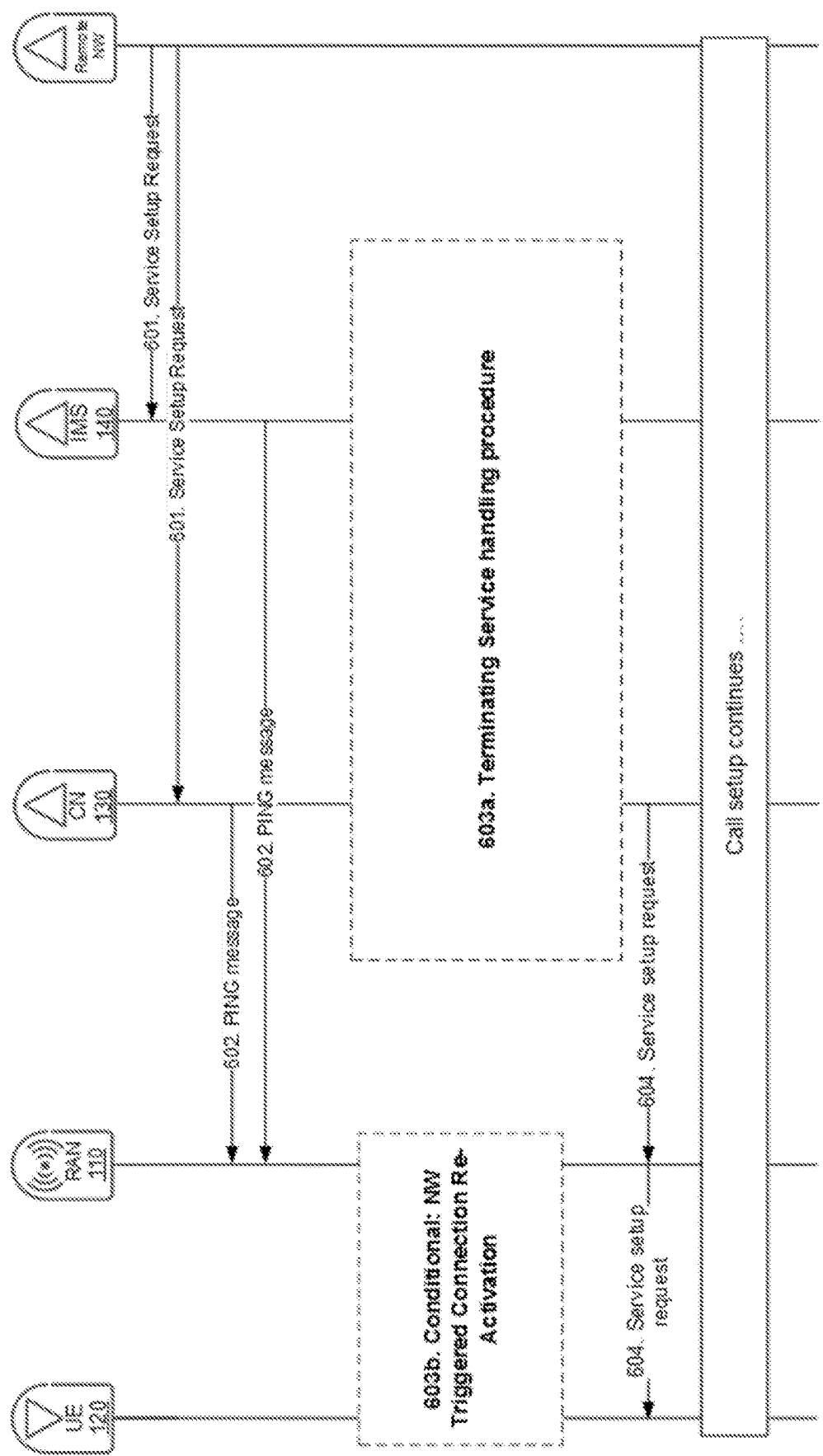
FIG. 6 is a flowchart illustrating a terminating call flow performed over multiple domains according to a first embodiment herein.

FIG. 6 discloses a first embodiment herein. In Action 601 a serving core network node 130, 140, such as e.g. a Core Network (CN) node 130 or an IMS node 140, may receive a service request from a remote network. In a conventional communications network, such as in the communications network shown in FIG. 3, the CN node 130 or the IMS node 140 would perform the terminating service request procedure 603a and forward the service setup request to the target UE 120, see action 604, after the terminating service request procedure is finished. Thereafter, the Network triggered Connection Re-Activation would be performed in order to transition from IDLE state to CONNECTED state. According to the embodiments herein however, the CN node 130 and/or the IMS node may send a PING message towards the target UE 120 in step 602 prior to performing the terminating service handling procedure. Thereby, the NW triggered Connection Re-Activation procedure 603b may be performed in parallel with the terminating service handling procedure 603a instead of in sequential order.

Figure 7:
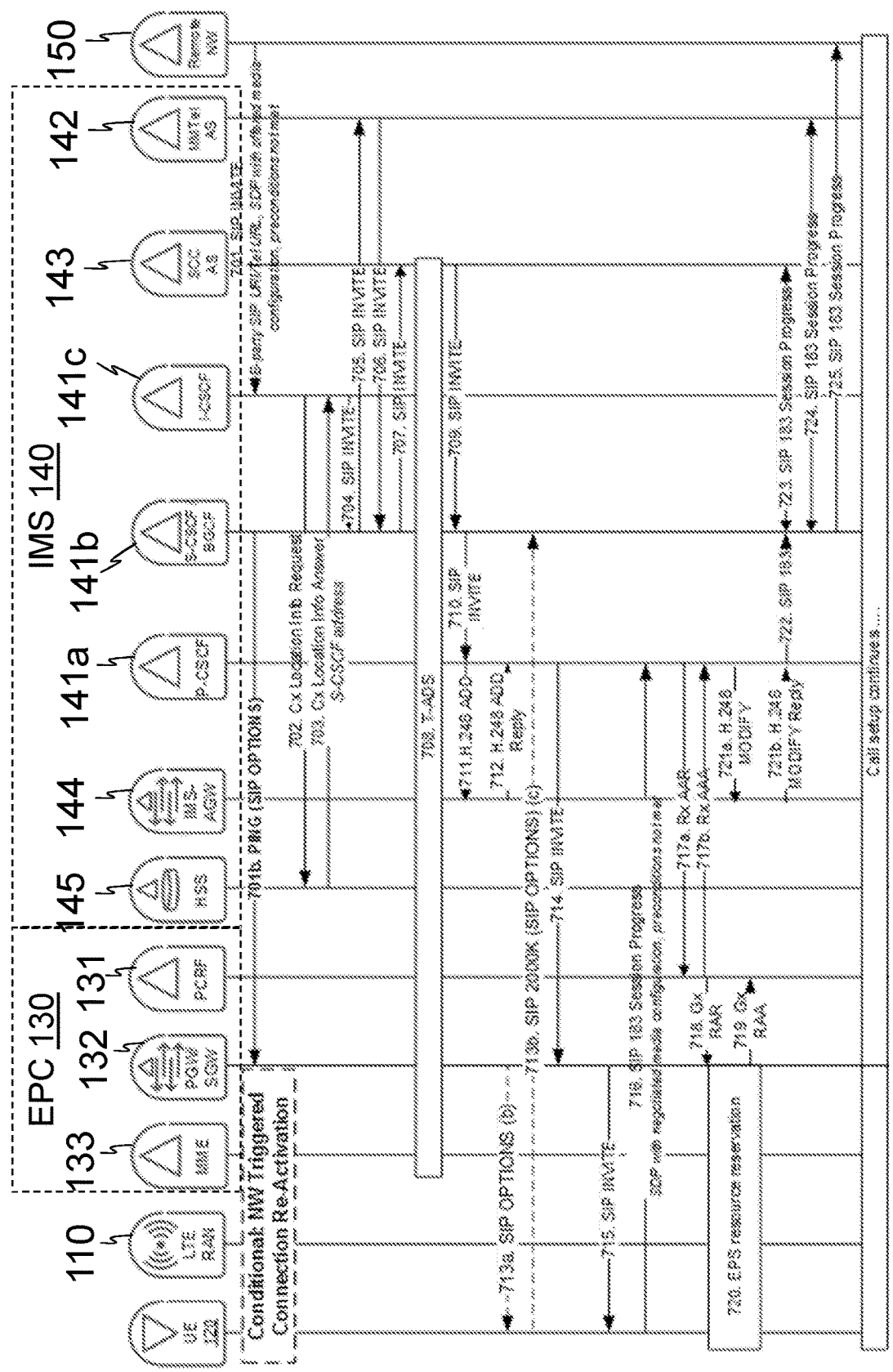
FIG. 7 is a flowchart illustrating a terminating call flow performed over multiple domains according to a second embodiment herein.

According to a second embodiment herein, which is disclosed in FIG. 7, the serving core network node 130, 140 may be an IMS node 140 in the form of a terminating CSCF node 141a-c. The terminating CSCF node 141a-c may upon reception of a service setup request, such as e.g. a terminating SIP INVITE, in action 701, send the ping message, such as e.g. the SIP OPTIONS message, directly towards the target UE 120, in action 701a, prior to performing the LIR/LIA in actions 702 and 703, when the CSCF node 141a-c is configured as an S-CSCF node 141b collocated with an I-CSCF node 141c. Such a configuration of the CSCF node 141a-c may also be referred to as an I/S-CSCF. When the CSCF node 141a-c is configured as a collocated I/S-CSCF node 141b-c, the CSCF node 141a-c normally knows already at the reception of the service setup request if the CSCF node 141a-c handles the target user, and the ping message may therefore be sent prior to the LIR/LIA in actions 702, 703. The service setup request may herein also be referred to as a terminating request. As can be seen in FIG. 7, the ping message may be sent upon receipt of the SIP invite 701 by the CSCF node 141a-c. Thus the NW Triggered Connection Re-Activation procedure is performed in parallel with the terminating call handling procedures performed by the IMS node 140, such as the LIR/LIA performed in action 702 and 703, forwarding the SIP INVITE to the S-CSCF node 141*b* to which the target UE 120 is registered in action 704, the MMTEL invocation towards the MMTEL AS node 142 as performed in action 705, 706 and SCCAS invocation towards the SCCAS node 143 as performed in action 707 and 709 and the T-ADS as performed in action 708. The P-CSCF node 141*a* may then send a H.248 ADD request to an IMS-AGW node 144 in action 711 requesting the IMS-AGW node 144 to allocate transport resources to the target UE 120. When the P-CSCF node 141*a* has received the allocated transport resources from the IMS-AGW node 144 in action 712, the P-CSCF node 141*a* forwards the SIP INVITE to the PGW node 132 which has the target UE 120 registered. When the terminating service handling procedures, such as e.g. the terminating call handling procedures, have been performed, the target UE 120 may in this embodiment already have left the IDLE state and may be in RRC-connected mode, which may herein also be referred to as CONNECTED mode, and can thus receive the service setup request, such as the SIP Invite from the PGW node 132 in action 715 almost immediately. Prior to receiving the SIP INVITE the target UE 120 may receive the SIP OPTIONS message from the PGW node 132 in action 713*a* and may send a SIP 200OK message comprising the UEs capabilities back to the S-CSCF node 141*b* in action 713*b*. By executing the NW Triggered Connection Re-Activation procedure in parallel with the MMTEL and SCCAS invocation, the T-ADS and the LIR/LIA, the setup time for setting up a service with the target UE 120 may be reduced by approximately 450 ms.

Thereafter, the service setup process may be identical to the service setup process performed in actions 315 to 324 in FIG. 3.

After the target UE 120 has received the SIP INVITE the target UE 120 may send the SIP 183 Session Progress message to the P-CSCF node 141*a* in action 716. The S-CSCF node 141*b* in action 717*a* sends an AA Request (AAR) message to the Policy and Charging Rule Function (PCRF) node 131 through the Rx interface to provide Session Information.

The PCRF node 131 in action 718 may send a Re-Auth-Request (RAR) message to the PGW node 132 through the Gx interface, instructing the PGW node 132 to modify bearer information for a media stream, such as e.g. a VoLTE media stream.

The PGW node 132 may perform an EPS resource reservation procedure in order to reserve resources across the network in action 620 and then sends a Re-Auth Answer (RAA) message to the PCRF node 131 through the Gx interface in action 719.

The PCRF node 131 may send an AA Answer (AAA) message to the P-CSCF node 141*a* through the Rx interface in response to the AAR message received from the S-CSCF node 141*b* in action 717*b*.

In actions 721*a* the PCSCF may send a H.248 MODIFY request to the IMS-AGW node 144 requesting the IMS-AGW node 144 to modify the allocated transport resources to the target UE 120 and may receive a H.248 MODIFY Reply from the IMS-AGW node 144 in action 721*b*.

Thereafter the SIP 183 Session Progress message may be forwarded from the P-CSCF node 141*a* to the S-CSCF node 141*b* in action 722. The S-CSCF node 141*b* may then exchange the SIP 183 Session Progress message with the SCCAS node 143 in action 723 and with the MMTel AS node 142 in action 724, before the SIP 183 Session Progress message may be forwarded by the S-CSCF node 141*b* to the remote NW 150 in action 725 in order to connect the service, such as the VoLTE call.

Figure 8:
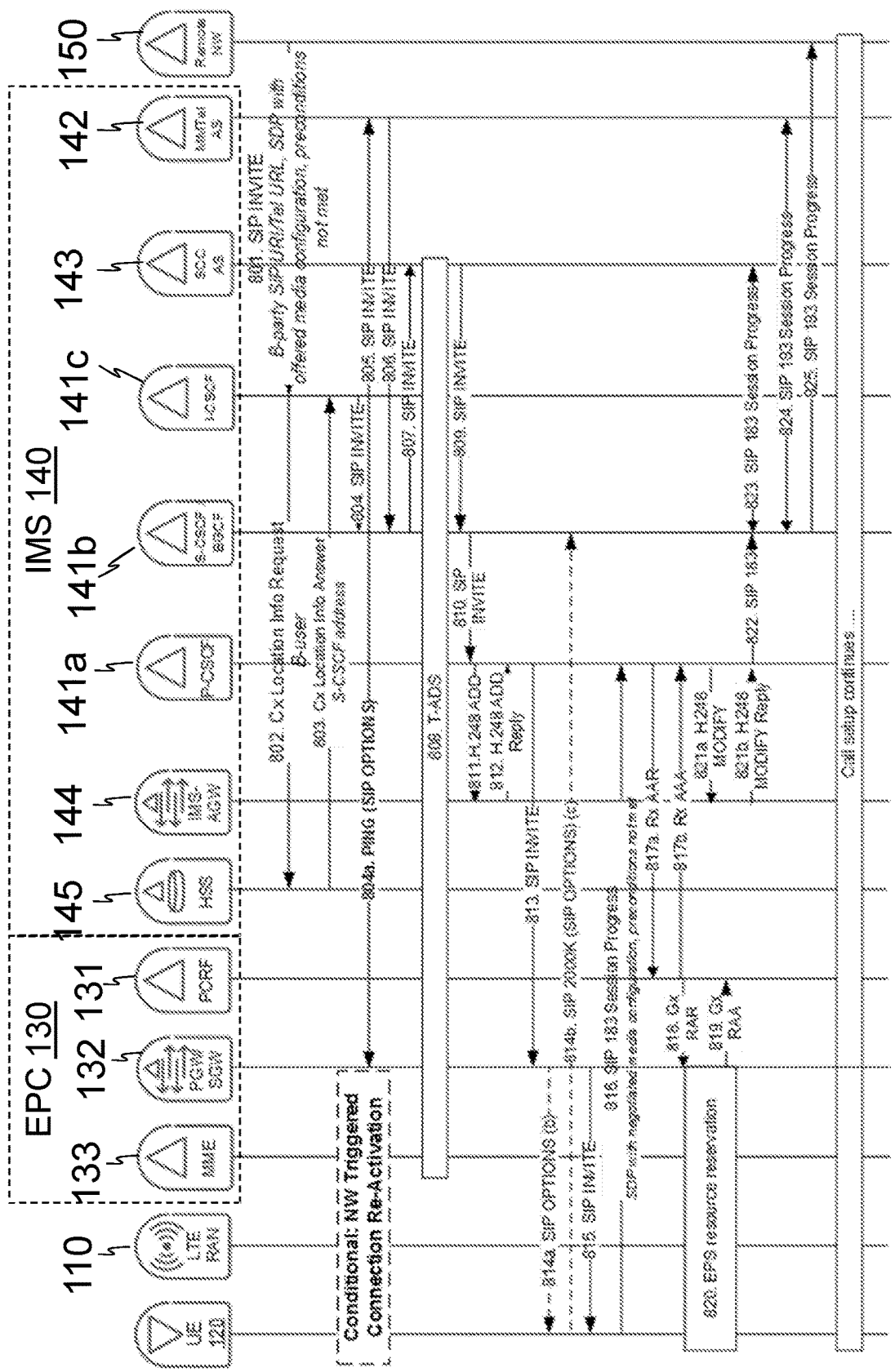
FIG. 8 is a flowchart illustrating a terminating call flow performed over multiple domains according to a third embodiment herein.

According to a third embodiment herein, which is disclosed in FIG. 8, the ping message, such as e.g. the SIP OPTIONS message, may be sent in action 804*a* immediately after a terminating S-CSCF node 141*b* has received the service setup request, such as e.g. a SIP INVITE, in action 804 after a LIR/LIA has been performed in actions 802 and 803. This may e.g. be the case when the target UE 120 is not registered in the collocated I/S-CSCF node 141*bc*, and thus is registered in another S-CSCF node 141*b*. By performing the LIR/LIA in actions 802 and 803 the CSCF node 141*a-c* may determine the location of the target UE 120 in order to route the ping message to the S-CSCF node 141 *b* associated with the target UE 120. Thereby the NW Triggered Connection Re-Activation procedure is performed in parallel with the terminating service handling procedures MMTEL invocation towards the MMTEL AS node 142 performed by the S-CSCF node 141*b* in action 805 and 806, SCCAS invocation towards the SCCAS node 143 performed by the S-CSCF node 141*b* in actions 807 and 809 and T-ADS performed in action 808. The P-CSCF node 141*a* may then send a H.248 ADD request to an IMS-AGW node 144 in action 811 requesting the IMS-AGW node 144 to allocate transport resources to the target UE 120. When the P-CSCF node 141*a* has received the allocated transport resources from the IMS-AGW node 144 in action 812, the P-CSCF node 141*a* forwards the SIP INVITE to the PGW node 132 which has the target UE 120 registered. When the terminating service handling procedures, such as e.g. the terminating call handling procedures, have been performed, the target UE 120 may in this embodiment already have left the IDLE state and may be in RRC-connected mode, which may herein also be referred to as CONNECTED mode, and can thus receive the service setup request, such as the SIP Invite from the PGW node 132 in action 715 almost immediately, although a bit later than in the second embodiment described in FIG. 7. Thereby, the setup time for setting up a service with the target UE 120 may be reduced by approximately 400 ms.

Thereafter, the service setup process may be identical to the service setup process performed in actions 315 to 324 in FIG. 3 and actions 716 to 724 in FIG. 7.

After the target UE 120 has received the SIP INVITE the target UE 120 may send the SIP 183 Session Progress message to the P-CSCF node 141*a* in action 816. The S-CSCF node 141*b* in action 817*a* sends an AA Request (AAR) message to the Policy and Charging Rule Function (PCRF) node 131 through the Rx interface to provide Session Information.

The PCRF node 131 in action 818 may send a Re-Auth-Request (RAR) message to the PGW node 132 through the Gx interface, instructing the PGW node 132 to modify bearer information for a media stream, such as e.g. a VoLTE media stream.

The PGW node 132 may perform an EPS resource reservation procedure in order to reserve resources across the network in action 820 and then sends a Re-Auth Answer (RAA) message to the PCRF node 131 through the Gx interface in action 819.

The PCRF node 131 may send an AA Answer (AAA) message to the P-CSCF node 141*a* through the Rx interface in response to the AAR message received from the S-CSCF node 141*b* in action 817*b*.

In action 821*a* the PCSCF may send a H.248 MODIFY request to the IMS-AGW node 144 requesting the IMS-AGW node 144 to modify the allocated transport resources to the target UE 120 and may receive a H.248 MODIFY Reply from the IMS-AGW node 144 in action 821*b*.

Thereafter the SIP 183 Session Progress message may be forwarded from the P-CSCF node 141*a* to the S-CSCF node 141*b* in action 822. The S-CSCF node 141*b* may then exchange the SIP 183 Session Progress message with the SCCAS node 143 in action 823 and with the MMTel AS node 142 in action 824, before the SIP 183 Session Progress message may be forwarded by the S-CSCF node 141*b* to the remote NW 150 in action 825 in order to connect the service, such as the VoLTE call.

A new configuration, which may be referred to as OPTIONS, may be introduced in order to enable/disable the ping message. The new configuration may be optimized to only send a ping message to target UEs 120 that have registered over an LTE access determined by the PANI header.

In general, the ping message, such as e.g. the SIP OPTIONS message, may be triggered by any SIP entity in the call path of the IMS node 140. However, by sending the ping message from one of the first entities in the IMS node 140 receiving the service setup request, such as e.g. from the CSCF node 141*a-c*, a greater reduction of the service setup time can be achieved. The intention is to send the ping message, such as e.g. the SIP OPTIONS message, as early as possible and with high accuracy about the registered UE 120. The SIP OPTIONS message may e.g. be when the PANI header comprises one of the values 3GPP-E-UTRAN-FDD or 3GPP-EUTRAN-TDD. The earlier the ping message is sent the more time will be available for performing the paging procedure.

From an implementation and investment perspective the embodiments described in FIGS. 7 and 8 herein, have the advantage that the design impact is on the IMS node only.

Figure 9:
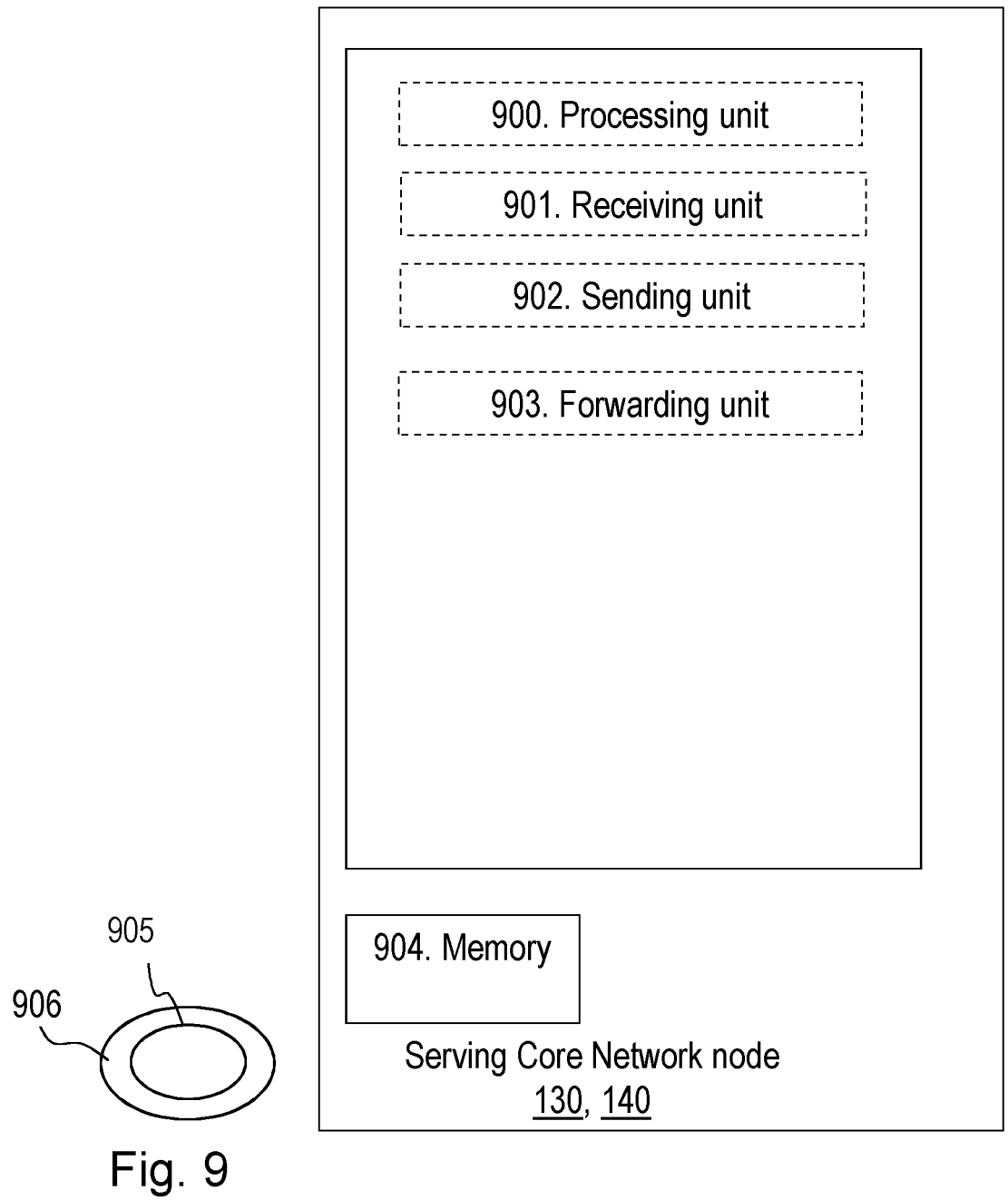
FIG. 9 is a schematic block diagram illustrating some first embodiments of the IMS node.

FIG. 9 is a block diagram depicting the serving core network node 130, 140 of a communications network, for handling a service setup for the target UE 120 located in the communications network 100. The serving core network node 130, 140 may comprise a processing unit 900, such as e.g. one or more processors, a receiving unit 901, a sending unit 902 and/or a forwarding unit 903 as exemplifying hardware units configured to perform the method as described herein.

The serving core network node 130, 140 is configured to, e.g. by means of the processing unit 900 and/or the receiving unit 901 being configured to, receive a service setup request directed towards the target UE 120.

The serving core network node 130, 140 is configured to, e.g. by means of the processing unit 900 and/or the sending unit 902 being configured to, send a ping message to the target UE 120 in response to the service setup request prior to a completion of a terminating service handling procedure of the serving network, such as an IMS. The terminating service handling procedure is completed when the service setup request is forwarded from a serving core network, towards the target UE 120. In some embodiments the serving core network node may be an IMS node 140 and the service handling procedure may be completed when the service setup request is forwarded from the IMS node 140 to an EPC node 130 associated with the target UE 120.

The serving core network node 130, 140 may be configured to, e.g. by means of the processing unit 900 and/or the sending unit 902 being configured to, send the ping message to the target UE 120 in response to the service setup request, within a time frame ti of 0-30 ms from receiving the service setup request.

The serving core network node 130, 140 may be configured to, e.g. by means of the processing unit 900 and/or the sending unit 902 being configured to, send the ping message in response to the service setup request prior to performing any further actions of the terminating call handling procedures in the serving core network, such as the IMS.

The serving core network node 130, 140 may be an IMS node 140 and may be configured to, e.g. by means of the processing unit 900 and/or the sending unit 902 being configured to, send the ping message in response to the service setup request prior to performing a T-ADS procedure in the IMS.

The serving core network node 130, 140, such as the IMS node 140 may be configured to, e.g. by means of the processing unit 900 and/or the sending unit 902 being configured to, send the ping message in response to the service setup request prior to performing a service invocation with an MMTel-AS node 142 in the IMS.

The serving core network node 130, 140, such as the IMS node 140 may be configured to, e.g. by means of the processing unit 900 and/or the sending unit 902 being configured to, send the ping message in response to the service setup request prior to performing a LAR in the IMS.

The serving core network node 130, 140 may be configured to, e.g. by means of the processing unit 900 and/or the receiving unit 901 being configured to, receive the service setup request from a remote network.

The serving core network node 130, 140, such as the IMS node 140, may in some embodiments be a CSCF node 141*a-c*. In some embodiments herein the CSCF node 141*a-c* may comprise a S-CSCF node 141*b*, wherein the S-CSCF node 141*b* may be configured to, e.g. by means of the processing unit 900 and/or the sending unit 902 being configured to, send the ping message in response to the received service setup request. When the CSCF node 141 *a-c* comprises the S-CSCF node 141*b*, the CSCF node 141 *a-c* may be configured to, e.g. by means of the processing unit 900 and/or the receiving unit 901 being configured to, forward the service setup request received from the remote network to the S-CSCF node 141*b* via an I-CSCF node 141*c* comprised in the CSCF node 141*a-c*.

The serving core network node 130, 140 may be configured to, e.g. by means of the processing unit 900 and/or the receiving unit 901 being configured to, receive the service setup request in the form of a SIP invite, a SIP Secure SIPS invite, a H.323 protocol invite or a WebRTC invite.

The serving core network node 130, 140, such as the IMS node 140, may further be configured to, e.g. by means of the processing unit 900 and/or the sending unit 902 being configured to, send the ping message as a SIP OPTION message to the UE 120.

Figure 10:
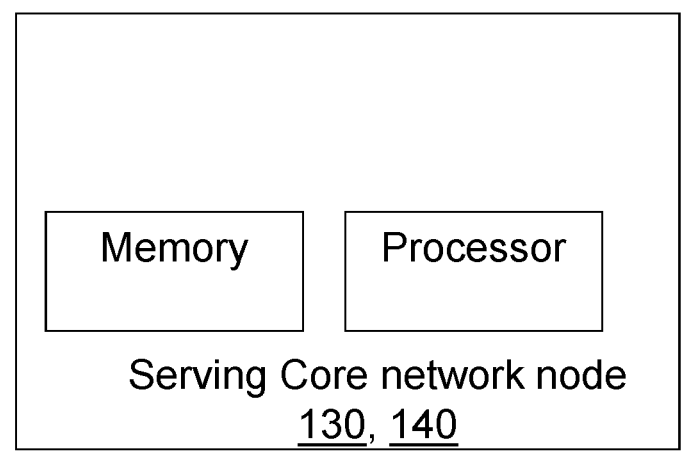
FIG. 10 is a schematic block diagram illustrating some second embodiments of the IMS node.
Figure 10:
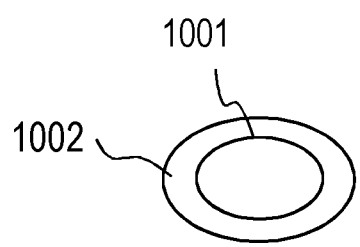

The embodiments herein may be implemented through a respective processor or one or more processors of a processing circuitry in the serving core network node 130, 140 as depicted in FIG. 10, which processing circuitry is configured to perform the method actions according to FIG. 5 and the embodiments described above for the serving core network node 130, 140, such as e.g. the IMS node 140.

The embodiments may be performed by the processor together with respective computer program code for performing the functions and actions of the embodiments herein. The program code mentioned above may also be provided as a computer program product, for instance in the form of a data carrier carrying computer program code for performing the embodiments herein when being loaded into the serving core network node 130, 140. One such carrier may be in the form of a CD ROM disc. It is however feasible with other data carriers such as e.g. a memory stick. The computer program code may furthermore be provided as pure program code on a server and downloaded to the serving core network node 130, 140.

The serving core network node 130, 140 may further comprise a memory. The memory may comprise one or more memory units to be used to store data on, such as software, patches, system information, configurations, diagnostic data, performance data and/or applications to perform the methods disclosed herein when being executed, and similar.

The method according to the embodiments described herein for the serving core network node 130, 140 may be implemented by means of e.g. a computer program product 905, 1001 or a computer program, comprising instructions, i.e., software code portions, which, when executed on at least one processor, cause at least one processor to carry out the actions described herein, as performed by the serving core network node 130, 140. The computer program product 905, 1001 may be stored on a computer-readable storage medium 906, 1002, e.g. a disc or similar. The computer-readable storage medium 906, 1002, having stored thereon the computer program, may comprise instructions which, when executed on at least one processor, cause the at least one processor to carry out the actions described herein, as performed by the serving core network node 130, 140. In some embodiments, the computer-readable storage medium may be a non-transitory computer-readable storage medium. The computer program may also be comprised on a carrier, wherein the carrier is one of an electronic signal, optical signal, radio signal, or a computer readable storage medium.

As will be readily understood by those familiar with communications design, that functions means or units may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a network node.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network nodes or devices will appreciate the cost, performance, and maintenance trade-offs inherent in these design choices.

The serving core network node 130, 140, such as the IMS node 140, described in the embodiments herein may also be implemented in a cloud. Although the method actions performed by the serving core network node 130, 140 herein are discussed in the context of a radio access node, the method may also be performed by a core network node or a distributed node comprised in a first cloud, such as e.g. a server and/or a datacenter. The method actions may e.g. be performed by a logical function, which may be a centralized service hosted on the core network node or the distributed node.

It shall be noted that the nodes mentioned herein may be arranged as separate nodes or may be collocated within one or more nodes in the communications network. When a plurality of nodes are collocated in one node, the single node may be configured to perform the actions of each of the collocated nodes.

Further Extensions and Variations

Figure 11:
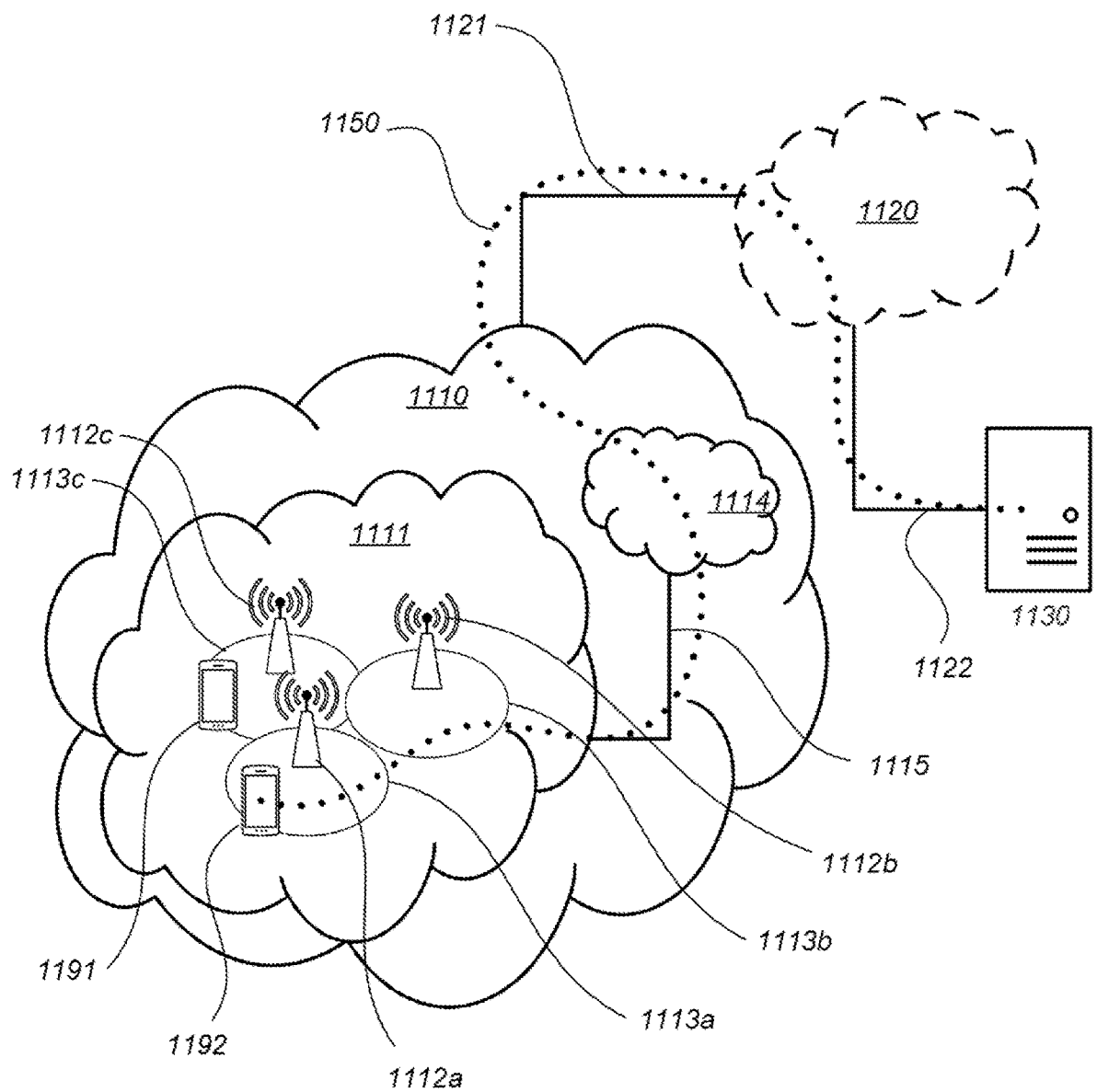
FIG. 11 is a schematic overview of a telecommunication network connected via an intermediate network to a host computer in accordance with some embodiments.

With reference to FIG. 11, in accordance with an embodiment, a communication system includes a telecommunication network 1110 such as the wireless communications network 100, e.g. a WLAN, such as a 3GPP-type cellular network, which comprises an access network 1111, such as a radio access network, and a core network 1114. The access network 1111 comprises a plurality of base stations 1112a, 1112b, 1112c, such as e.g. the network node 110, access nodes, AP STAs NBs, eNBs, gNBs or other types of wireless access points, each defining a corresponding coverage area 1113a, 1113b, 1113c. Each base station 1112a, 1112b, 1112c is connectable to the core network 1114 over a wired or wireless connection 1115. A first UE such as e.g. the UE 120 such as a Non-AP STA 1191 located in coverage area 1113c is configured to wirelessly connect to, or be paged by, the corresponding base station 1112c. A second UE 1192 e.g. the wireless device 122 such as a Non-AP STA in coverage area 1113a is wirelessly connectable to the corresponding base station 1112a. While a plurality of UEs 1191, 1192 are illustrated in this example, the disclosed embodiments are equally applicable to a situation where a sole UE is in the coverage area or where a sole UE is connecting to the corresponding base station 1112.

The telecommunication network 1110 is itself connected to a host computer 1130, which may be embodied in the hardware and/or software of a standalone server, a cloud-implemented server, a distributed server or as processing resources in a server farm. The host computer 1130 may be under the ownership or control of a service provider, or may be operated by the service provider or on behalf of the service provider. The connections 1121, 1122 between the telecommunication network 1110 and the host computer 1130 may extend directly from the core network 1114 to the host computer 1130 or may go via an optional intermediate network 1120. The intermediate network 1120 may be one of, or a combination of more than one of, a public, private or hosted network; the intermediate network 1120, if any, may be a backbone network or the Internet; in particular, the intermediate network 1120 may comprise two or more sub-networks (not shown).

The communication system of FIG. 11 as a whole enables connectivity between one of the connected UEs 1191, 1192 and the host computer 1130. The connectivity may be described as an over-the-top (OTT) connection 1150. The host computer 1130 and the connected UEs 1191, 1192 are configured to communicate data and/or signaling via the OTT connection 1150, using the access network 1111, the core network 1114, any intermediate network 1120 and possible further infrastructure (not shown) as intermediaries. The OTT connection 1150 may be transparent in the sense that the participating communication devices through which the OTT connection 1150 passes are unaware of routing of uplink and downlink communications. For example, a base station 1112 may not or need not be informed about the past routing of an incoming downlink communication with data originating from a host computer 1130 to be forwarded (e.g., handed over) to a connected UE 1191. Similarly, the base station 1112 need not be aware of the future routing of an outgoing uplink communication originating from the UE 1191 towards the host computer 1130.

Example implementations, in accordance with an embodiment, of the UE, base station and host computer discussed in the preceding paragraphs will now be described with reference to FIG. 12. In a communication system 1200, a host computer 1210 comprises hardware 1215 including a communication interface 1216 configured to set up and maintain a wired or wireless connection with an interface of a different communication device of the communication system 1200. The host computer 1210 further comprises processing circuitry 1218, which may have storage and/or processing capabilities. In particular, the processing circuitry 1218 may comprise one or more programmable processors, application-specific integrated circuits, field programmable gate arrays or combinations of these (not shown) adapted to execute instructions. The host computer 1210 further comprises software 1211, which is stored in or accessible by the host computer 1210 and executable by the processing circuitry 1218. The software 1211 includes a host application 1212. The host application 1212 may be operable to provide a service to a remote user, such as a UE 1230 connecting via an OTT connection 1250 terminating at the UE 1230 and the host computer 1210. In providing the service to the remote user, the host application 1212 may provide user data which is transmitted using the OTT connection 1250.

The communication system 1200 further includes a base station 1220 provided in a telecommunication system and comprising hardware 1225 enabling it to communicate with the host computer 1210 and with the UE 1230. The hardware 1225 may include a communication interface 1226 for setting up and maintaining a wired or wireless connection with an interface of a different communication device of the communication system 1200, as well as a radio interface 1227 for setting up and maintaining at least a wireless connection 1270 with a UE 1230 located in a coverage area (not shown in FIG. 12) served by the base station 1220. The communication interface 1226 may be configured to facilitate a connection 1260 to the host computer 1210. The connection 1260 may be direct or it may pass through a core network (not shown in FIG. 12) of the telecommunication system and/or through one or more intermediate networks outside the telecommunication system. In the embodiment shown, the hardware 1225 of the base station 1220 further includes processing circuitry 1228, which may comprise one or more programmable processors, application-specific integrated circuits, field programmable gate arrays or combinations of these (not shown) adapted to execute instructions. The base station 1220 further has software 1221 stored internally or accessible via an external connection.

The communication system 1200 further includes the UE 1230 already referred to. Its hardware 1235 may include a radio interface 1237 configured to set up and maintain a wireless connection 1270 with a base station serving a coverage area in which the UE 1230 is currently located. The hardware 1235 of the UE 1230 further includes processing circuitry 1238, which may comprise one or more programmable processors, application-specific integrated circuits, field programmable gate arrays or combinations of these (not shown) adapted to execute instructions. The UE 1230 further comprises software 1231, which is stored in or accessible by the UE 1230 and executable by the processing circuitry 1238. The software 1231 includes a client application 1232. The client application 1232 may be operable to provide a service to a human or non-human user via the UE 1230, with the support of the host computer 1210. In the host computer 1210, an executing host application 1212 may communicate with the executing client application 1232 via the OTT connection 1250 terminating at the UE 1230 and the host computer 1210. In providing the service to the user, the client application 1232 may receive request data from the host application 1212 and provide user data in response to the request data. The OTT connection 1250 may transfer both the request data and the user data. The client application 1232 may interact with the user to generate the user data that it provides.

Figure 12:
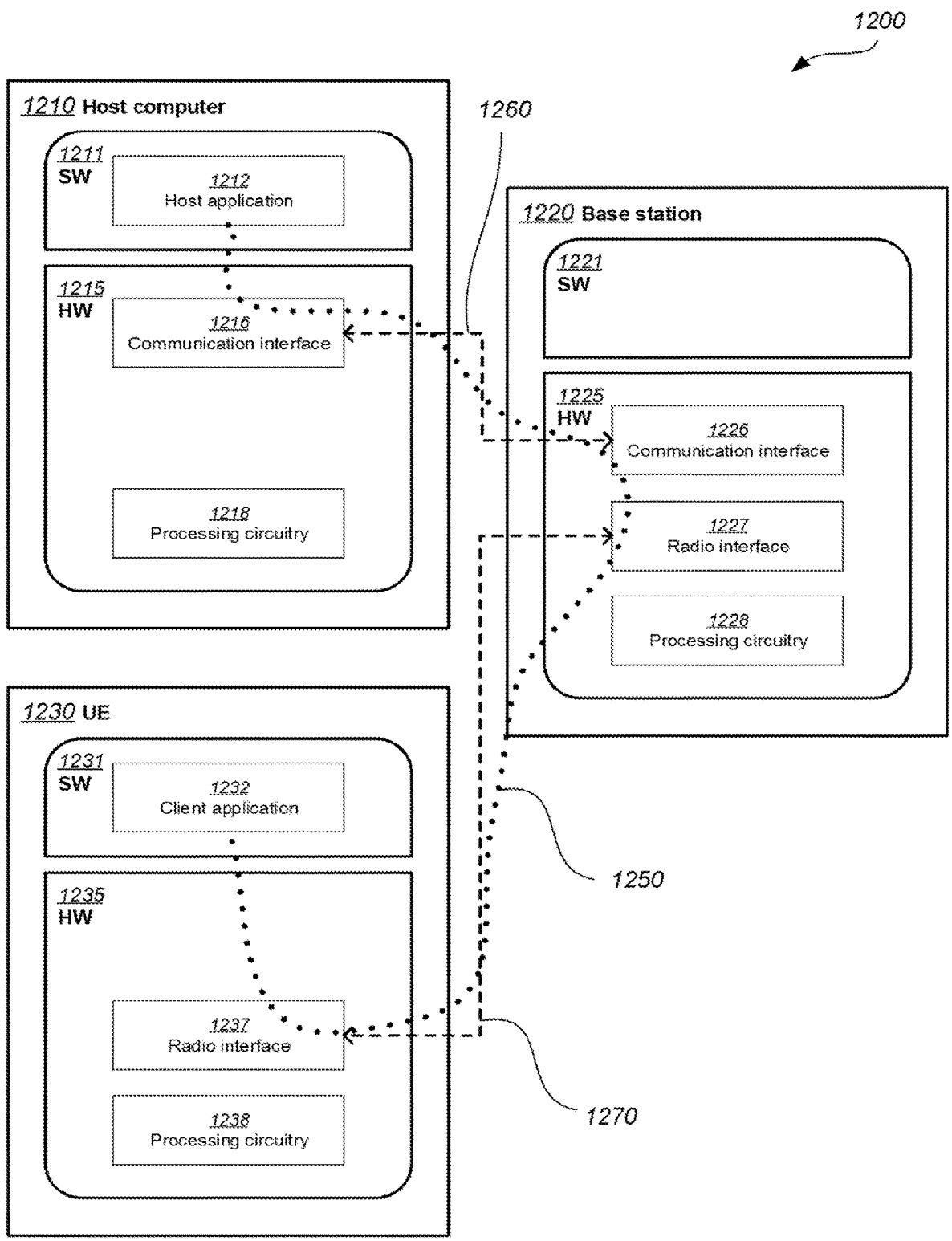
FIG. 12 is a schematic overview of a host computer communicating via a base station with a user equipment over a partially wireless connection in accordance with some embodiments.

It is noted that the host computer 1210, base station 1220 and UE 1230 illustrated in FIG. 12 may be identical to the host computer 1130, one of the base stations 1112a, 1112b, 1112c and one of the UEs 1191, 1192 of FIG. 11, respectively. This is to say, the inner workings of these entities may be as shown in FIG. 12 and independently, the surrounding network topology may be that of FIG. 11.

In FIG. 12, the OTT connection 1250 has been drawn abstractly to illustrate the communication between the host computer 1210 and the use equipment 1230 via the base station 1220, without explicit reference to any intermediary devices and the precise routing of messages via these devices. Network infrastructure may determine the routing, which it may be configured to hide from the UE 1230 or from the service provider operating the host computer 1210, or both. While the OTT connection 1250 is active, the network infrastructure may further take decisions by which it dynamically changes the routing (e.g., on the basis of load balancing consideration or reconfiguration of the network).

The wireless connection 1270 between the UE 1230 and the base station 1220 is in accordance with the teachings of the embodiments described throughout this disclosure. One or more of the various embodiments improve the performance of OTT services provided to the UE 1230 using the OTT connection 1250, in which the wireless connection 1270 forms the last segment. More precisely, the teachings of these embodiments may improve the latency since the paging is performed in parallel with the service handling procedure performed by the communications network rather than in sequential order and thereby provide benefits such as reduced user waiting time and better responsiveness.

A measurement procedure may be provided for the purpose of monitoring data rate, latency and other factors on which the one or more embodiments improve. There may further be an optional network functionality for reconfiguring the OTT connection 1250 between the host computer 1210 and UE 1230, in response to variations in the measurement results. The measurement procedure and/or the network functionality for reconfiguring the OTT connection 1250 may be implemented in the software 1211 of the host computer 1210 or in the software 1231 of the UE 1230, or both. In embodiments, sensors (not shown) may be deployed in or in association with communication devices through which the OTT connection 1250 passes; the sensors may participate in the measurement procedure by supplying values of the monitored quantities exemplified above, or supplying values of other physical quantities from which software 1211, 1231 may compute or estimate the monitored quantities. The reconfiguring of the OTT connection 1250 may include message format, retransmission settings, preferred routing etc.; the reconfiguring need not affect the base station 1220, and it may be unknown or imperceptible to the base station 1220. Such procedures and functionalities may be known and practiced in the art. In certain embodiments, measurements may involve proprietary UE signaling facilitating the host computer's 1210 measurements of throughput, propagation times, latency and the like. The measurements may be implemented in that the software 1211, 1231 causes messages to be transmitted, in particular empty or 'dummy' messages, using the OTT connection 1250 while it monitors propagation times, errors etc.

FIG. 13 is a flowchart illustrating a method implemented in a communication system, in accordance with one embodiment. The communication system includes a host computer, a base station such as a AP STA, and a UE such as a Non-AP STA which may be those described with reference to FIGS. 11 and 12. For simplicity of the present disclosure, only drawing references to FIG. 13 will be included in this section. In a first action 1310 of the method, the host computer provides user data. In an optional subaction 1311 of the first action 1310, the host computer provides the user data by executing a host application. In a second action 1320, the host computer initiates a transmission carrying the user data to the UE. In an optional third action 1330, the base station transmits to the UE the user data which was carried in the transmission that the host computer initiated, in accordance with the teachings of the embodiments described throughout this disclosure. In an optional fourth action 1340, the UE executes a client application associated with the host application executed by the host computer.

FIG. 14 is a flowchart illustrating a method implemented in a communication system, in accordance with one embodiment. The communication system includes a host computer, a base station such as an AP STA, and a UE such as a Non-AP STA which may be those described with reference to FIGS. 11 and 12. For simplicity of the present disclosure, only drawing references to FIG. 14 will be included in this section. In a first action 1410 of the method, the host computer provides user data. In an optional subaction (not shown) the host computer provides the user data by executing a host application. In a second action 1420, the host computer initiates a transmission carrying the user data to the UE. The transmission may pass via the base station, in accordance with the teachings of the embodiments described throughout this disclosure. In an optional third action 1430, the UE receives the user data carried in the transmission.

FIG. 15 is a flowchart illustrating a method implemented in a communication system, in accordance with one embodiment. The communication system includes a host computer, a base station such as a AP STA, and a UE such as a Non-AP STA which may be those described with reference to FIGS. 11 and 12. For simplicity of the present disclosure, only drawing references to FIG. 15 will be included in this section. In an optional first action 1510 of the method, the UE receives input data provided by the host computer. Additionally or alternatively, in an optional second action 1520, the UE provides user data. In an optional subaction 1521 of the second action 1520, the UE provides the user data by executing a client application. In a further optional subaction 1511 of the first action 1510, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 1530, transmission of the user data to the host computer. In a fourth action 1540 of the method, the host computer receives the user data transmitted from the UE, in accordance with the teachings of the embodiments described throughout this disclosure.

FIG. 16 is a flowchart illustrating a method implemented in a communication system, in accordance with one embodiment. The communication system includes a host computer, a base station such as a AP STA, and a UE such as a Non-AP STA which may be those described with reference to FIGS. 11 and 12. For simplicity of the present disclosure, only drawing references to FIG. 16 will be included in this section. In an optional first action 1610 of the method, in accordance with the teachings of the embodiments described throughout this disclosure, the base station receives user data from the UE. In an optional second action 1620, the base station initiates transmission of the received user data to the host computer. In a third action 1630, the host computer receives the user data carried in the transmission initiated by the base station.

When using the word "comprise" or "comprising" it shall be interpreted as non-limiting, i.e. meaning "consist at least of". When using the word "set" herein, it shall be interpreted as meaning "one or more".

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method, performed by a serving core network node in a communications network, for handling a service setup for a target User Equipment (UE) located in the communications network, wherein the serving core network node is a node of an IP Multimedia Subsystem (IMS) in the communication network, the method comprising:
receiving a service setup request directed towards the target UE;
sending a ping message to the target UE to wake the target UE from an IDLE state, in response to the service setup request prior to a completion of a terminating service handling procedure of the IMS, wherein the terminating service handling procedure is completed, when the service setup request is forwarded from the IMS to an Evolved Packet Core (EPC) associated with the target UE, and wherein the ping message is sent in response to the service setup request prior to performing a Terminating Access Domain Selection procedure (T-ADS) in the IMS, such that a transmission of the ping message takes place in parallel with performing the T-ADS;
initiating the terminating service handling procedure; and
performing the T-ADS.

2. The method according to claim 1, wherein the ping message to the target UE is sent in response to the service setup request within a time frame of 0-30 ms from receiving the service setup request.

3. The method according to claim 1, wherein the ping message is sent in response to the service setup request prior to performing a service invocation with a Multimedia Telephony Application Server (MMTel-AS) node in the IMS.

4. The method according to claim 1, wherein the ping message is sent in response to the service setup request prior to performing a Location Information Request (LIR) in the IMS.

5. The method according to claim 1, wherein the service setup request received by the serving core network node is received from a remote network.

6. The method according to claim 1, wherein the serving core network node is a Call Session Control Function (CSCF) node.

7. The method according to claim 6, wherein the CSCF node comprises a Serving CSCF (S-CSCF) node and wherein the S-CSCF sends the ping message in response to the received service setup request.

8. The method according to claim 7, wherein the service setup request received by the S-CSCF node is forwarded from an Interrogating CSCF (I-CSCF) node comprised in the CSCF node.

9. The method according to claim 1, wherein the service setup request is a Session Initiation Protocol (SIP) invite, a H.323 protocol invite or a Web Real-Time Communication (WebRTC) invite.

10. The method according to claim 1, wherein the ping message is a Session Initiation Protocol (SIP) OPTION message sent to the UE.

11. A serving core network node, in a communications network, for handling a service setup for a target User Equipment (UE) located in the communications network, wherein the serving core network node is a node of an IP Multimedia Subsystem (IMS) in the communication network, the serving core network node comprising:
at least one processor; and
a memory containing instructions which, when executed by the at least one processor, cause the serving core network node to:
receive a service setup request directed towards the target UE;
send a ping message to the target UE to wake the target UE from an IDLE state, in response to the service setup request prior to a completion of a terminating service handling procedure of the IMS, wherein the terminating service handling procedure is completed, when the service setup request is forwarded from the IMS to an Evolved Packet Core (EPC) associated with the target UE, and wherein the ping message is sent in response to the service setup request prior to performing a Terminating Access Domain Selection procedure (T-ADS) in the IMS, such that a transmission of the ping message takes place in parallel with performing the T-ADS;
initiate the terminating service handling procedure; and
perform the T-ADS.

12. The serving core network node according to claim 11, wherein the serving core network node is to send the ping message to the target UE in response to the service setup request within a time frame of 0-30 ms from receiving the service setup request.

13. The serving core network node according to claim 11, wherein the serving core network node is to send the ping message in response to the service setup request prior to performing a service invocation with a Multimedia Telephony Application Server (MMTel-AS) node in the IMS.

14. The serving core network node according to claim 11, wherein the serving core network node is to send the ping message in response to the service setup request prior to performing a Location Information Request (LIR) in the IMS.

15. The serving core network node according to claim 11, wherein the serving core network node is to receive the service setup request from a remote network.

16. The serving core network node according to claim 11, wherein the serving core network node is a Call Session Control Function (CSCF) node.

17. The serving core network node according to claim 16, wherein the CSCF node comprises a Serving CSCF (S-CSCF) node and wherein the S-CSCF node is to send the ping message in response to the received service setup request.

18. The serving core network node according to claim 17, wherein the service setup request received by the S-CSCF node is forwarded from an Interrogating CSCF (I-CSCF) node comprised in the CSCF node.

19. The serving core network node according to claim 11, wherein the service setup request is a Session Initiation Protocol (SIP) invite, a H.323 protocol invite or a Web Real-Time Communication (WebRTC) invite.

20. The serving core network node according to claim 11, wherein the ping message is a Session Initiation Protocol (SIP) OPTION message to the target UE.

* * * * *